(12) United States Patent
Mortsolf et al.

(10) Patent No.: US 11,552,859 B2
(45) Date of Patent: Jan. 10, 2023

(54) INTERACTIVE GRAPHICAL MODEL-BASED CONFIGURATION CONTROL OF NETWORKED PHYSICAL ASSETS USING LOGICAL TRANSACTIONAL CONFIGURATION CHANGE RULES

(71) Applicant: OasisWorks Inc., Billerica, MA (US)

(72) Inventors: Timothy Mortsolf, Amherst, MA (US); Scott Myelle, Pelham, NH (US); Matthew Scott, Springfield, MO (US); Anil Gunturu, Lexington, MA (US)

(73) Assignee: OasisWorks Inc., Billerica, MA (US)

( * ) Notice: Subject to any disclaimer, the term of this patent is extended or adjusted under 35 U.S.C. 154(b) by 0 days.

(21) Appl. No.: 17/338,786

(22) Filed: Jun. 4, 2021

(65) Prior Publication Data
US 2022/0393952 A1   Dec. 8, 2022

(51) Int. Cl.
*H04L 41/22* (2022.01)
*H04L 43/045* (2022.01)
*G06F 3/04847* (2022.01)

(52) U.S. Cl.
CPC .......... *H04L 41/22* (2013.01); *G06F 3/04847* (2013.01); *H04L 43/045* (2013.01)

(58) Field of Classification Search
CPC ... H04L 41/22; H04L 43/045; H04L 65/4015; G06F 3/04847; G06F 3/04812; G06F 3/04845
See application file for complete search history.

(56) References Cited

U.S. PATENT DOCUMENTS

| | | | | |
|---|---|---|---|---|
| 8,494,977 | B1 * | 7/2013 | Yehuda | G06Q 10/00 706/11 |
| 10,009,232 | B2 | 6/2018 | Duncan et al. | |
| 11,012,320 | B2 | 5/2021 | Mortsolf et al. | |
| 2006/0130040 | A1 * | 6/2006 | Subramanian | G06F 8/65 717/168 |
| 2007/0124126 | A1 * | 5/2007 | Lee | G06F 30/20 703/6 |
| 2008/0104217 | A1 * | 5/2008 | Srinivasa | H04L 41/0806 709/223 |
| 2008/0126439 | A1 * | 5/2008 | Kaminsky | H04L 41/0856 |
| 2009/0132753 | A1 * | 5/2009 | Blea | G06F 11/1469 711/103 |
| 2009/0158295 | A1 * | 6/2009 | Burg | G06F 21/554 718/108 |

(Continued)

FOREIGN PATENT DOCUMENTS

WO    2007033005 A2    3/2007

*Primary Examiner* — Daniel W Parcher
(74) *Attorney, Agent, or Firm* — Intrinsic Law Corp.

(57) ABSTRACT

Physical assets in a network are graphically modeled and controlled using a monitoring and control interface. Prior to committing configuration changes to the physical assets, the draft configuration changes are analyzed to determine if they violate any logical configuration change rules. The logical configuration rules can be model-based according to target physical asset(s) for the draft configuration changes. A logical configuration change rule violation can be graphically displayed on the monitoring and control interface. The configuration changes can be stored to debug the physical assets and to roll back the configuration of the physical assets to a prior state.

10 Claims, 16 Drawing Sheets

(56) References Cited

U.S. PATENT DOCUMENTS

| | | | |
|---|---|---|---|
| 2010/0169837 A1* | 7/2010 | Hyndman | G06F 16/9558 715/848 |
| 2011/0138225 A1* | 6/2011 | Gunabalasubramaniam | G06F 11/1461 714/15 |
| 2013/0239011 A1* | 9/2013 | Red | G06T 5/00 715/743 |
| 2016/0270740 A1 | 9/2016 | Raisoni et al. | |
| 2017/0208097 A1* | 7/2017 | Kirby | H04L 63/20 |
| 2018/0130260 A1* | 5/2018 | Schmirler | G06T 19/006 |

* cited by examiner

INTERACTIVE GRAPHICAL MODEL-BASED CONFIGURATION CONTROL OF NETWORKED PHYSICAL ASSETS USING LOGICAL TRANSACTIONAL CONFIGURATION CHANGE RULES

TECHNICAL FIELD

This application relates to monitoring, displaying and interactively controlling a system using advanced graphics methods and hardware.

BACKGROUND

It is necessary or desirable that operators of complicated systems be able to see and monitor the condition of their systems. Examples abound and would be too far-reaching to enumerate, however, some contexts in which a complicated distributed system calls for observation, telemetry and monitoring include traffic, utilities, data storage systems, financial systems, inventory controls, military applications, space and undersea systems, communication networks, and others. Since large, complex, or distributed systems like these are challenging to monitor directly by traveling to and observing the state of various components of the system at once, centralized observation systems and dashboards.

Existing methods and systems can also allow centralized control or actuation of system components by a human or automated operator, including based on observations, measurements or other data reports regarding the state of the system. By way of example, using a modern central command and control system, a handful of human operators can monitor and control a large industrial complex such as a power plant or other semi-automated industrial site. Visual indicators can represent certain conditions of the power plant to operators in a control room (or any remote location) either using direct connections to gauges and sensors installed in the plant, or on a computer-display screen. Out-of-band measurements can be indicated using a variety of visual and/or audible alarms. The status of various equipment, valves and machines can be likewise indicated to the operators. The operators can respond to the indicated conditions of the plant by remotely operating component machinery such as by remotely opening or shutting valves, starting or stopping pumps, and so on. All of this can be achieved from the operators' control station using suitable user interface elements such as push-buttons, relays, computer-controlled actuators, and other means.

In another example, human and/or processor-controlled operators can monitor and operate a communications network spanning thousands of physical miles. Using a suitable programmed interface, the operators and/or control systems are able to adjust network load, secure and open channels, bring servers on or off line, and otherwise optimize operating conditions in the network.

FIG. 1 illustrates a networked system 10 comprising a plurality of assets 110 (e.g., machinery or components coupled to network 100). Each asset 110 may be coupled to network 100 by a communication interface, local controller or switch 105 that communicates data between asset 110 and network 100. The extremities of the networked system 10 may comprise hardware, firmware or software that can be designed and configured according to an applicable protocol relating to the application at hand.

A computer 120 may be also coupled to the network 100, e.g., using a network communication bus or card that sends and receives data according to a communication protocol. The computer 120 may comprise or be a client processor or computing machine having a user interface 122 and including a display screen 124 for displaying a variety of system conditions, measurements, or other data. The interface 122 and display 124 can be used to allow an operator 140 to monitor and/or control aspects of system 10. Conventional user interfaces and controls can include a keyboard, mouse, touch screen, or similar implements.

As mentioned above, the operator 140 can see a condition of interest in the system and take corrective action, e.g., taking an asset online or offline by entering a suitable input to interface 122. The interface 122, through computer 120 may send a corresponding control signal over network 100 to a controller or switch 105 that can effect a change to its respective asset 110. The configuration settings can be stored in a persistent database 150. In an embodiment, the computer 120 can store the configuration settings in the database 150, and the configuration settings can be applied to the assets 110 from the database 150 immediately, at later time, or a combination thereof depending on the state and/or availability of the assets 110.

While current monitoring and control systems include graphical user interfaces (GUI) that allow the representation of various data on a computer screen or similar displays, and basic controls, existing systems are still limited. The range of operations possible with current systems is growing but remains limited due to technical factors, bandwidth, cost, and the limitations of human ingenuity.

In some situations, poor user interfaces, unclear status reports, and slow or sub-optimal controls can result in damage or injuries if equipment and assets are incorrectly operated. For example, in a transportation environment (e.g., rail or air traffic controls) disastrous consequences can occur by improper monitoring and control of such automated systems. Similarly, in military, industrial, power plant utilities, communication systems, financial data systems, or other contexts, poorly designed or operated automation and controls can result in significant failures and losses.

Today's automation solution stacks are typically comprised of several tools targeted at very specific functions at specific layers in a solution stack and are integrated together by hand by skilled Dev-Ops staff or expensive systems integrators. Exacerbating this complexity, the proliferation of open source software in this space requires the kind of build, bundle and packaging capabilities usually only found within software development firms. Almost all of today's automation solution stacks are designed to operate in a single datacenter and assume equipment colocation and direct networking adjacencies to function. Remote sites with intermittent connectivity can require local site-level installations in order to perform site-level bootstrapping, configuration, upgrades and manage an end-to-end solution offering.

Using a collection of today's automation tools is complicated. Installations typically require complicated bundle installations, package downloads from the internet with little-to-no version controls and minimal documentation. Configuring them usually requires remote connections to command lines with highly proprietary command structures requiring a user to become an expert at the structure and syntax of each tool. Integrating, deploying, configuring and operating today's automation tools at the scale of these new distributed network architectures will be near impossible.

Better monitoring and control systems are needed to enable ever-growing demands to observe and control large and complicated systems and networks including information networks. Some or all of these issues are addressed by the present invention.

SUMMARY

Example embodiments described herein have innovative features, no single one of which is indispensable or solely responsible for their desirable attributes. The following description and drawings set forth certain illustrative implementations of the disclosure in detail, which are indicative of several example ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a method for implementing changes to physical assets, comprising: receiving a dataset at a console coupled to a data network, the dataset corresponding to a plurality of data-connected physical assets coupled to the data network, wherein each data-connected physical asset is associated with a respective feature set of the data-connected physical asset that can be monitored and controlled over said network using respective monitoring and control signals; using a console graphics processing unit (GPU) in said console, generating a model-based three-dimensional vector graphics representation of said data-connected physical assets, along with respective states of said data-connected physical assets, based on respective data in said dataset; on a console display screen in electrical communication with the console, displaying the model-based three-dimensional vector graphics representation of said data-connected physical assets, including displaying a state of a plurality of configuration settings of said data-connected physical assets; using said console GPU, executing an interface abstraction layer to generate a plurality of model-based graphical user interface tools corresponding to the configuration settings of said data-connected physical assets; on said console display screen, displaying a vector graphic representation of the model-based graphical user interface tools so as to present an interactive control interface including said model-based graphical user interface tools to a user of the console; using said interactive control interface, accepting a plurality of inputs through said one or more model-based graphical user interface tools, the inputs corresponding to a plurality of draft configuration changes of said data-connected physical assets; using a console processor to determine whether any of the draft configuration changes violates any logical configuration change rules; and when a first draft configuration change violates a first logical configuration change rule, using the GPU to update the model-based three-dimensional vector graphics representation of said data-connected physical assets to graphically indicate that the first draft configuration change violates the first logical configuration change rule.

In one or more embodiments, the method further comprises accepting a second input through said one or more model-based graphical user interface tools that modifies at least one of the draft configuration changes, in response to the violation of the first logical configuration change rule, to form a plurality of updated draft configuration changes. In one or more embodiments, the method further comprises using the console processor to determine whether any of the updated draft configuration changes violates any of the logical configuration change rules; and when a first updated draft configuration changes violates at least one logical configuration change rule, using the GPU to update the model-based three-dimensional vector graphics representation of said data-connected physical assets to graphically indicate that the first updated draft configuration change violates the at least one logical configuration change rule.

In one or more embodiments, the method further comprises using the console processor to determine whether the user is authorized to make each draft configuration change; and when the user is not authorized to make at least one draft configuration change, using the GPU to update the model-based three-dimensional vector graphics representation of said data-connected physical assets to graphically indicate that the at least one draft configuration change is not authorized. In one or more embodiments, the logical configuration rule is based on a data model of a class of said data-connected physical assets. In one or more embodiments, the method further comprises when none of the draft configuration changes violates any of the logical configuration change rules: with the console processor, translating each draft configuration change to a corresponding target data-connected physical asset format; and with the console processor, committing each draft configuration change to a corresponding target data-connected physical asset. In one or more embodiments, the method further comprises storing the draft configuration changes in computer-readable memory that is network accessible to the console processor. In one or more embodiments, the method further comprises after committing each draft configuration change, receiving a rollback request to restore a last configuration state of the data-connected physical assets.

In one or more embodiments, the method further comprises, in response to the rollback request and using the console processor: retrieving the draft configuration changes from the computer-readable memory; generating draft inverse configuration changes based on the draft configuration changes, the draft inverse configuration changes having a reverse sequence compared to the draft configuration changes; and determining whether any of the draft inverse configuration changes violates any of the logical configuration change rules. In one or more embodiments, the method further comprises when a first draft inverse configuration change violates at least one logical configuration change rule, using the GPU to update the model-based three-dimensional vector graphics representation of said data-connected physical assets to graphically indicate that the first draft inverse configuration change violates the at least one logical configuration change rule. In one or more embodiments, the method further comprises when none of the draft inverse configuration changes violates any of the logical configuration change rules: with the console processor, translating each draft inverse configuration change to the corresponding target data-connected physical asset format; and with the console processor, committing each draft inverse configuration change to the corresponding target data-connected physical asset.

Another aspect of the invention is directed to a system for monitoring and controlling networked physical assets, comprising: a computing console comprising a console processor configured and arranged to execute instructions for monitoring and controlling said physical assets, and to access data encoded into a data store of said console corresponding to a plurality of controllable features of said physical assets; and a graphics circuit configured and arranged to generate a graphical output onto a display screen coupled to said console, and further configured and arranged to execute machine-readable instructions to generate a plurality of displayable screen views onto said display screen, each of said screen views comprising a transparent background and screen coverage size and area, wherein a plurality of said screen views are simultaneously generated by said graphics circuit and presented in respective positions relative to one another on said display screen and each of said screen views presents respective information relating to one or more of the controllable features of said physical assets, and wherein each of said screen views presents an interactive control interface that includes one or more user interface tools permitting changing of the encoded data in said data store and changing of corresponding controllable features of the physical assets. The console processor is further configured and arranged to execute instructions to: receive a plurality of draft configuration changes of said physical assets through the one or more user interface tools; determine whether any of the draft configuration changes violates any logical configuration change rules; and when a first draft configuration change violates a first logical configuration change rule, using the graphics circuit to update at least one of the screen views to graphically indicate that the first draft configuration change violates the first logical configuration change rule.

BRIEF DESCRIPTION OF THE DRAWINGS

For a fuller understanding of the nature and advantages of the present concepts, reference is made to the detailed description of preferred embodiments and the accompanying drawings.

DETAILED DESCRIPTION

Figure 1:
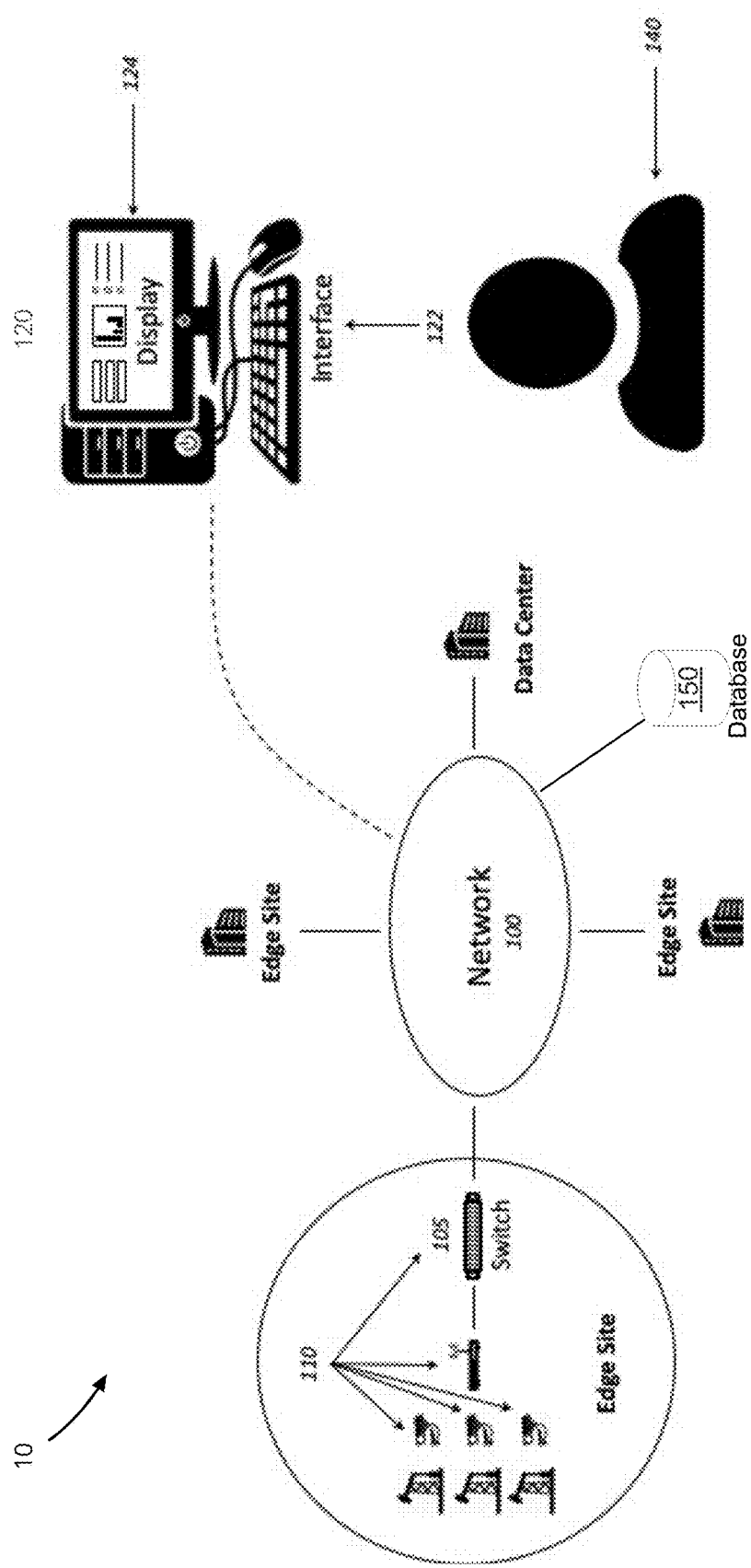
FIG. 1 illustrates a control system and panel for controlling a remote asset according to the prior art.

As mentioned above, improved monitoring and controls are desired and sometimes necessary for ever-growing complex networked systems. As an example, as 5G technologies and the Internet of Things (IoT) applications come into use, edge computing capabilities parallel their adoption, unlocking the potential for a new era of highly-distributed network architectures. These new architectures are the foundation for new standardization efforts aimed at defining how edge computing resources interwork with data center and cloud resources.

One application of the present disclosure relates to so-called fog computing, used to extend cloud computing resources closer to the things that produce and act on IoT data. These devices, described as Fog Nodes, can be deployed anywhere with a network connection: on a factory floor, on top of a power pole, alongside a railway track, in a vehicle, or on an oil rig. Fog Computing accelerates awareness and response to events by eliminating a round trip to the data center or cloud for analysis. It avoids the need for costly bandwidth additions by offloading gigabytes of network traffic from the core network and can be used in scenarios where there is no connection. It also protects sensitive data by keeping it inside a company's network. Users can place security features in a Fog network, from segmented network traffic to virtual firewalls.

In another application, Multi-access Edge Computing (MEC) is a network architecture concept that enables cloud computing capabilities and an IT service environment at the edge of a mobile network. Like Fog, the basic idea behind MEC is that by running applications and performing related processing tasks closer to the mobile device, network congestion is reduced, and applications perform better. MEC technology is designed to be implemented at mobile base stations and enables flexible and rapid deployment of new applications and services for customers. Combining elements of cloud and networking, MEC allows mobile operators to open their radio access network (RAN) to authorized third-parties, such as application developers and content providers. It uniquely allows software applications to tap into local content and real-time information about local access network conditions. By deploying various services and caching content at the network edge, mobile core networks are alleviated of further congestion and can efficiently serve local purposes.

Yet another application of the present disclosure is in the context of Central Office Re-architected as a Datacenter (CORD) combines the concept of Network Function Virtualization (NFV), Software Defined Networking (SDN), and the elasticity of commodity clouds to bring datacenter economics and cloud agility to a Telco Central Office. CORD lets operators manage their Central Offices (COs) using declarative modeling languages for agile, real-time configuration of new customer services. Several communication and data service providers are already supporting CORD. Providers can leverage a common hardware and software infrastructure to offer traditional connectivity as well as cloud services for residential, enterprise, and mobile customers. CORD allows residential, mobile, and enterprise customers to configure and manage their service packages with ease and in almost real time. One can also use CORD infrastructure to allow third parties to offer innovative services to common customers in a variety of partnership models.

While these new distributed architectures deliver versatility for end-to-end solution offerings, they create a new set of challenges for equipment installation, hardware bootstrapping, software stack installation, solution configuration and operational management. Without standardization, today's automation tools present a mix of deployment, configuration and operational interfaces typically individually managed. To solve the scale-out issue of having multiple tool sets, at multiple sites, each with their own operational interface, an improved automation framework could provide individual points of integration with abstracted representations of each existing tool's capabilities as a network wide model with a common API definition.

Figure 2:
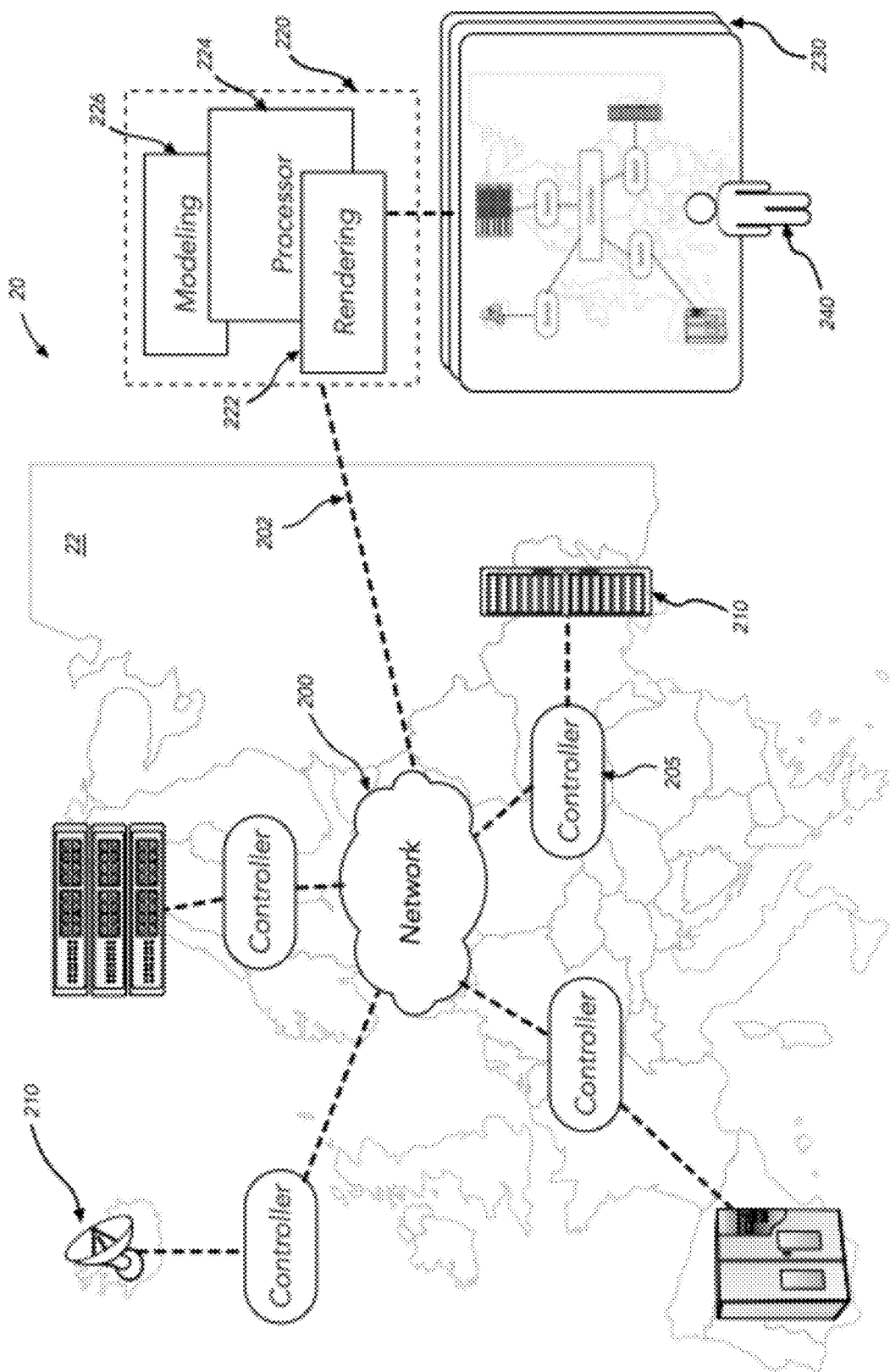
FIG. 2 illustrates an arrangement for monitoring and controlling one or more networked physical assets.

FIG. 2 illustrates a networked system 20 according to embodiments of this invention. As before, the system may have a plurality of distributed assets 210 (for example, information system assets, communications assets, hardware, software, or combinations thereof, or any other networked assets). Network 200 can include various levels of data network interconnectivity, generally represented here for simplicity, and can comprise the internet or other local and/or wide area networks or subnets, in data communication using one or more communication protocols. Assets 210 are distributed in a logical, virtual or physical domain or scene 22, which can be a mappable domain such as a network domain or a geographic domain. The position (logical and/or physical) of the individual assets 210 can be represented in or on a representation of domain. In one example, data processing assets 210 are shown or represented with respect to a domain or scene 22 comprising a map. The map can represent continents, countries, cities, or other domains down to a corporate or real estate level of representation, e.g., showing a commercial or residential facility.

A computer, computing circuit, processor-based machine, server, client, or other computing machine 220 is also coupled to network 200, for example over a local network connection or interface 202. The computer 220 comprises modeling capabilities provided by a modeling circuit and/or instruction set implemented in modeling engine 226, as well as a graphics or rendering circuit or processor and/or instruction set implemented in rendering engine 222. A general-purpose processor 224 and/or a plurality of special-purpose processors may reside in and be implemented in any suitable hardware, firmware and/or software configuration 224, and may be physically constructed or implemented in any form suiting a given purpose. In one aspect, special-purpose graphics processing circuits are used for rendering or other graphical functions as will be described below. In another aspect, specialized graphical methods or processes are implemented using rendering engine 222. The rendering engine 222 is configured, arranged, programmed and/or wired to apply machine-executable computer graphics methods, including newly-devised methods as described herein. Some such methods and in the present system employ one or more new hardware, firmware and/or software components, but may also employ existing known components, albeit in configurations and combinations that are novel and non-obvious to achieve some or all of the instant advantages, features and results.

As will be discussed further, the modeling engine 226 is configured, arranged, programmed and/or wired to apply a machine-executable model or models, including models to process model-driven geographic scenes, maps, animations, object layouts, and physical/virtual relationships between said things. The modeling engine is configured and arranged in some embodiments to execute special modeling instructions in shared or private circuitry thereof to implement models of various objects and resources of the system, e.g., based on parameters and descriptive attributes of the objects and resources.

In addition, a graphical console 230 is provided, which delivers a range of advanced monitoring and controls features to user or operator 240. The console 230 may include a display panel and/or other visual or audible indications representing one or more conditions, parameters or states of the system 20 or any assets 210 thereof. For example, the console 230 may deliver layered graphical information to operator 240 indicating utilization metrics of a data communication system 20, which may include the status of one or more servers, clients, routers, data storage units, fiber optic units, power supplies or other accessories. The information conveyed by console 230 may comprise a plurality of overlays that are logical or physical representations and may include a location or mapping layer on which the assets are represented with respect to a scene or domain 22.

An embodiment further comprises a mapping engine that operates in coordination with other components of the system 20 to obtain map data to form a displayable mapping layer for presentation to operator 240 via console 230. The mapping data can include open source map data, publicly available map data and/or proprietary map data and information associated with a map (e.g., street data, zoning data, weather data, traffic data, demographic data, financial data, and so on).

Yet another aspect allows operator 240 to interact with the system 20 or control the presentation of information on console 230 as well as to control one or more assets 210 (e.g., via a controller 205). Different visual layers of information may be turned on or off by the operator 240, changing the displayed data on demand.

Figure 3:
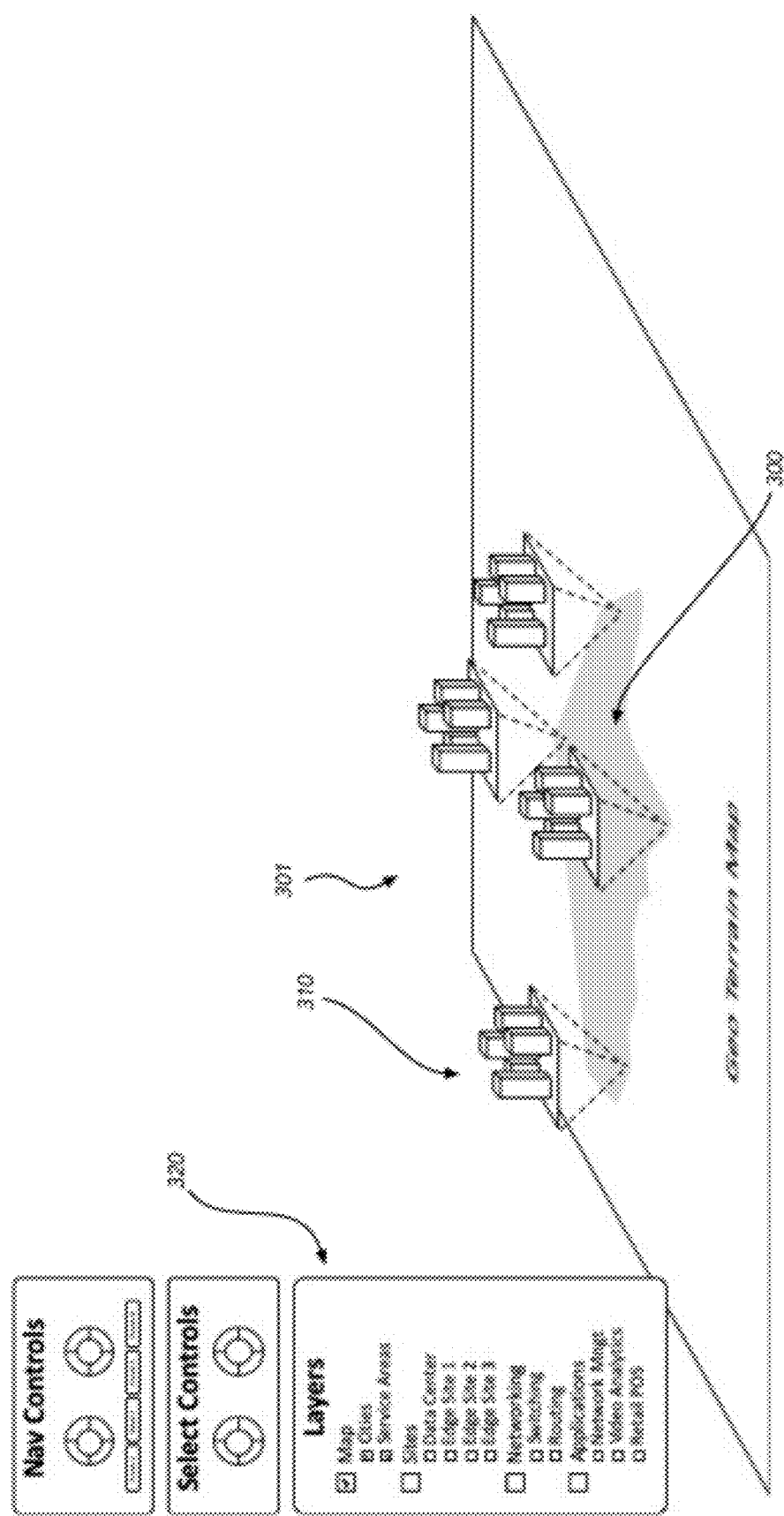
FIGS. 3 and 4 illustrate example site layers.

FIG. 3 illustrates an example of model-driven maps and other interface components that can be presented on console 230. As stated, one aspect of the invention is the ability to associate objects and resources or assets with a logical or geographic map, e.g., a map of a continent, region, country, city, and so on. The maps can be managed in the present system and method in or as a map layer 301, which can be one of a plurality of layers of information and resources. The system, which is able to communicate with or exchange data through network 200 can receive map data in any suitable format. The map data can comprise graphical data, raster data, vector data, information tiles, logical or image-based data, coordinate data, or any other geographic information that enables the system to construct a map 300 from a model. In some examples, open source or publicly available information can be obtained and rendered into images that suit the present application. Therefore, two- or three-dimensional maps, exterior spaces and/or interior spaces can be depicted and associated with other layers of data or resources. As an example, FIG. 3 illustrates a geographic map 300 showing a region and can furthermore depict other information on said map or in connection with it such as relative relationships of some infrastructure resources 310 to map 300 and to each other on map layer 301. The map can be interactive or customizable on account of its model and methods and may be scalable to rapidly and smoothly show any full or partial region of interest. System controls 320 presented along with the map can be used to enable or disable resources such as resources associated with infrastructure 310. The system controls 320 can in some aspects be used to toggle the view/hide attributes of one or a class of objects and resources. The system controls 320 can also be used to adjust the settings (e.g., controllable features) and/or configurations of the resources in infrastructure 310. The maps can represent physical and/or logical or virtual data and information as well as relationships. Various layers of information and objects are selectable by the operator or user 240 and are conveyed on a scene as appropriate.

Figure 4:
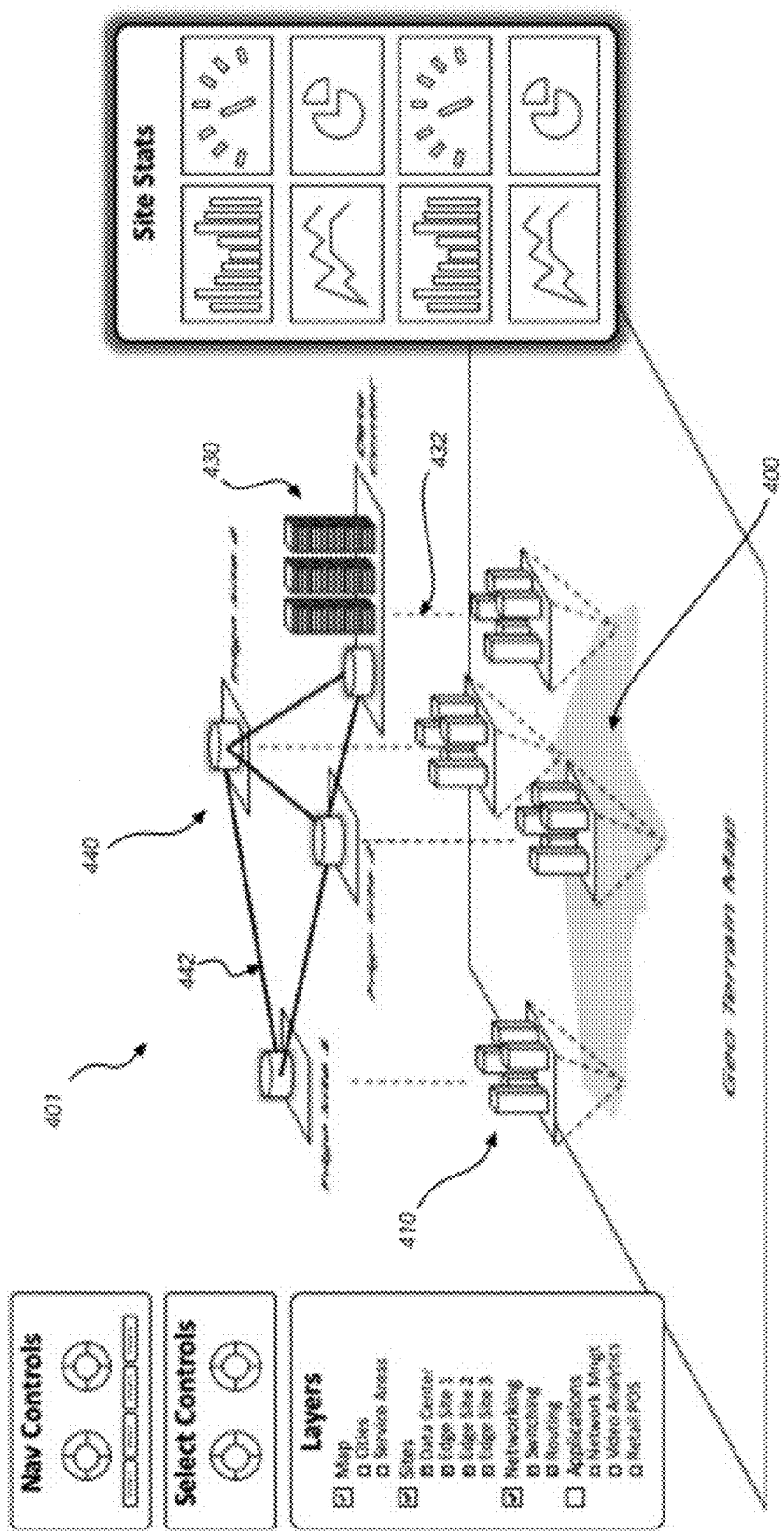

FIG. 4 illustrates an example scene that is model-driven according to this invention, and which presents a map 400 as described above. In addition, model-driven object layouts are provided in a site layer 401, for example showing various servers, routers or other networked resources 440 in connection with a location on the map 400. The site layer 401 can be represented in addition to or on top of the map layer 301 mentioned above. For example, but not by way of limitation, a country, city, neighborhood, or industrial complex or campus can be shown on the map. And, in an example, resources such as networked resources 440, data centers 430 or other resources are shown in relation to the infrastructure 410 with which they are associated, e.g., at certain locations can be shown in relation to their physical locations on the map. A scene can include street data and building height or other architectural information. In this example, the previously-described map layer is shown and dotted or dashed connections 432 may be used to associate a visual connection between a given resource in the site layer 401 and its corresponding location on the map layer 301.

Logical connections, e.g., communication pathways and network branches, 442, can also be depicted and visually inter-connect the routers, which are networked resources. In one example, components (e.g., routers) coupled using a DWM private tunnel connection or network are depicted. In addition, as shown, one or more visually-illustrated stacks of software agents, resources, or data structures can be associated with their respective servers, routers or hardware resources. An operator can therefore see which resources are available at what locations and can determine what applications are installed or active on each resource. In an aspect, selection of a certain network slice determines the layers, data, information or graphical content shown on the console. In another aspect, a user or operator can set a virtual camera position using a scene dropdown menu selector or other user interface. Zooming, panning, rotating and other functions are possible, which may be implemented herein using specialized high-end gaming hardware, software and methods previously not employed in this or related fields. In a non-limiting instance, the present invention uses a forked instance of a graphics construct to render 3D objects and place assets in a 3D space. The graphics construct can be in some embodiments a Javascript-based WebGL rendering software used for 3D game systems, including an open source variety thereof. In one non-limiting instance, a JSON construct is used for some or all modeling aspects, which can permit a Web browser to affect data in a database. The present system can provide model-driven object layouts, which can be shown on exterior and/or interior views of a physical or logical scene.

Figure 5:
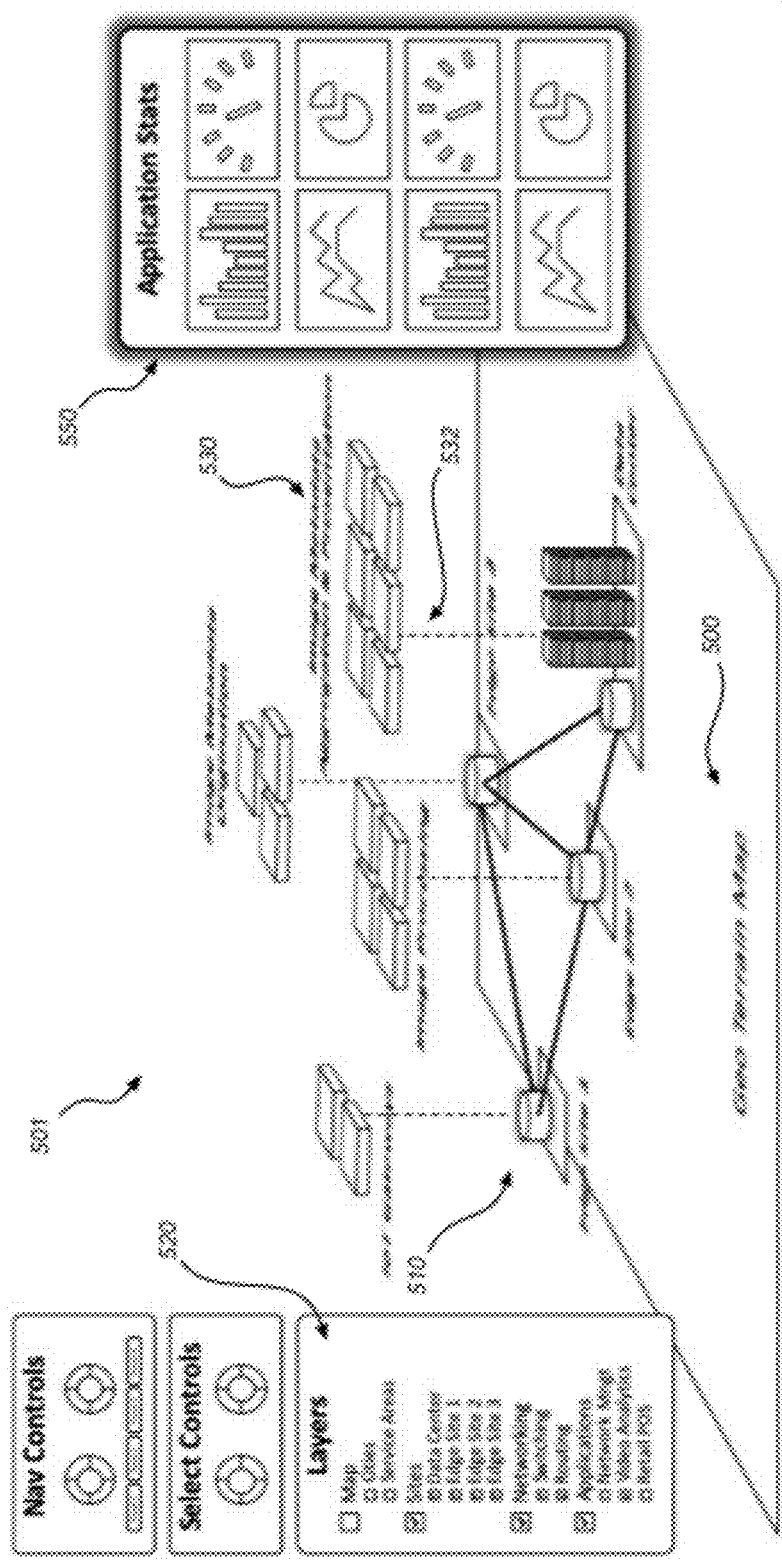
FIG. 5 illustrates an example application layer.

FIG. 5 illustrates an example application layer 501 of the present system and method. The application layer 501 can depict further examples of data, objects and attributes of networked resources 510 with respect to a map layer terrain map 500. The application layer 501 has a controls panel 520 accessible to the user of the console, which allows customizing the display and viewing of various things in the application layer 501 such as network analytics, video analytics, retail point of sale (POS) and other features. Application stats are displayed in some aspects in a display panel 550 dedicated for this purpose. Applications 530 may be associated with corresponding resources 510 using visual connections 532 such as dashed or dotted lines. The examples provided are not meant to be limiting but show what software applications are installed or running on the selected server assets. In an example embodiment, it may be that one server is not capable of satisfying the computing needs of a given software application (for example if too many customers are being serviced by the application). In this situation, multiple servers will be employed to provide the needed application. On the other hand, sometimes one server may be more than adequate to satisfy the requirements of a software process and can in fact execute multiple software processes on one server. In this instance, a single server can be shown with a plurality of software processes or workloads running thereon. For this reason, the available servers are set out as shown on an imaginary plane in Cartesian relation. Again, this is but one option, and the present system and method comprehend a large number of other possible arrangements without loss of generality.

FIGS. 6A-D illustrate an example site view 601 and related assets and controls according to some aspects of the invention and in the context of a non-limiting IT assets example.

IT networked assets 600 are presented in a site view 601, including for example a representation of various networked computing assets 600 (e.g., many servers arranged in a plurality of server stacks or racks). These resources or assets 600 can be depicted in realistic or physically relevant form (e.g., displaying three-dimensional representations of the actual server stacks in their server racks) using the graphical processing hardware and software components and methods of the invention, or in an abstracted view such as geometric 2D or 3D primitives. The type of asset 600 can be differentiated by overlaying text thereon describing the asset (e.g., Leaf, Spine, WAN, etc.) or by differentiating the asset's color, shape, size or other visual attribute. Photo-realistic or near-photo-realistic representations of the resources (e.g., servers) can be prepared to best aid operators in understanding and recognizing the nature and configuration of their systems in some embodiments. However, the resources can also be simplified or represented in other ways that do not physically resemble them, as desired.

In an example, the assets represent information technology (IT) assets such as computing machines, servers, etc. as previously mentioned. The assets can be arranged or grouped logically or physically. Statistics or status information can be displayed for this layer at rack stats panel 650, server group stats 652, server type stats 654 or hypervisor stats 656. Each of these stats panels provides a view of a respective set of performance data (stats) aggregated at its respective layer of the present solution. Panel 650 may provide a user with performance data aggregated for an entire rack of servers. Panel 652 may provide the user with performance data aggregated for a specific group or subset of servers. Panel 654 may provide the user with performance data aggregated across a certain type of server. Panel 656 may provide the user with performance data for a specific type of hypervisor. The layers themselves are shown or hidden using layers control panel 620.

Figure 6A:
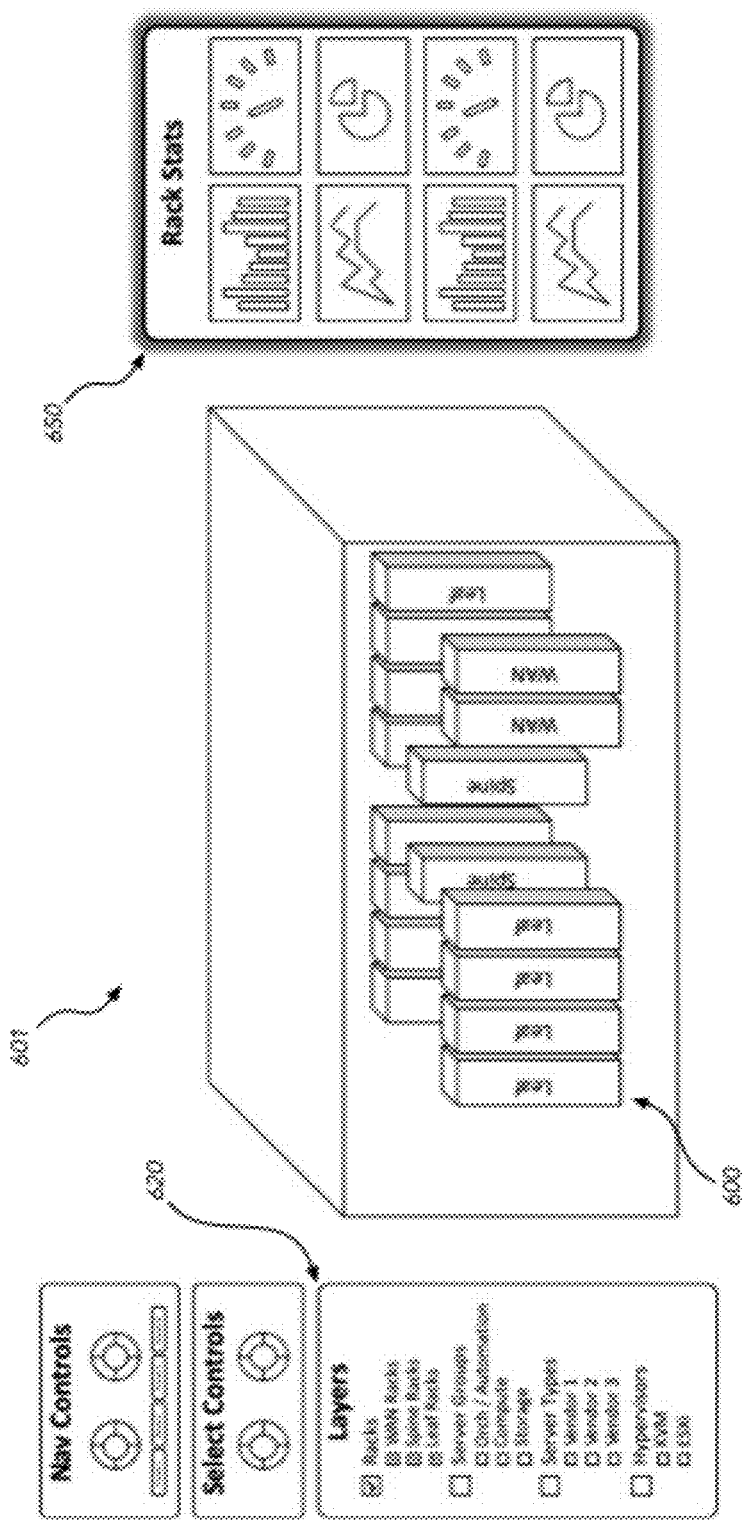
FIGS. 6A-D illustrate a site view and controls related to networked assets in some embodiments.
Figure 6B:
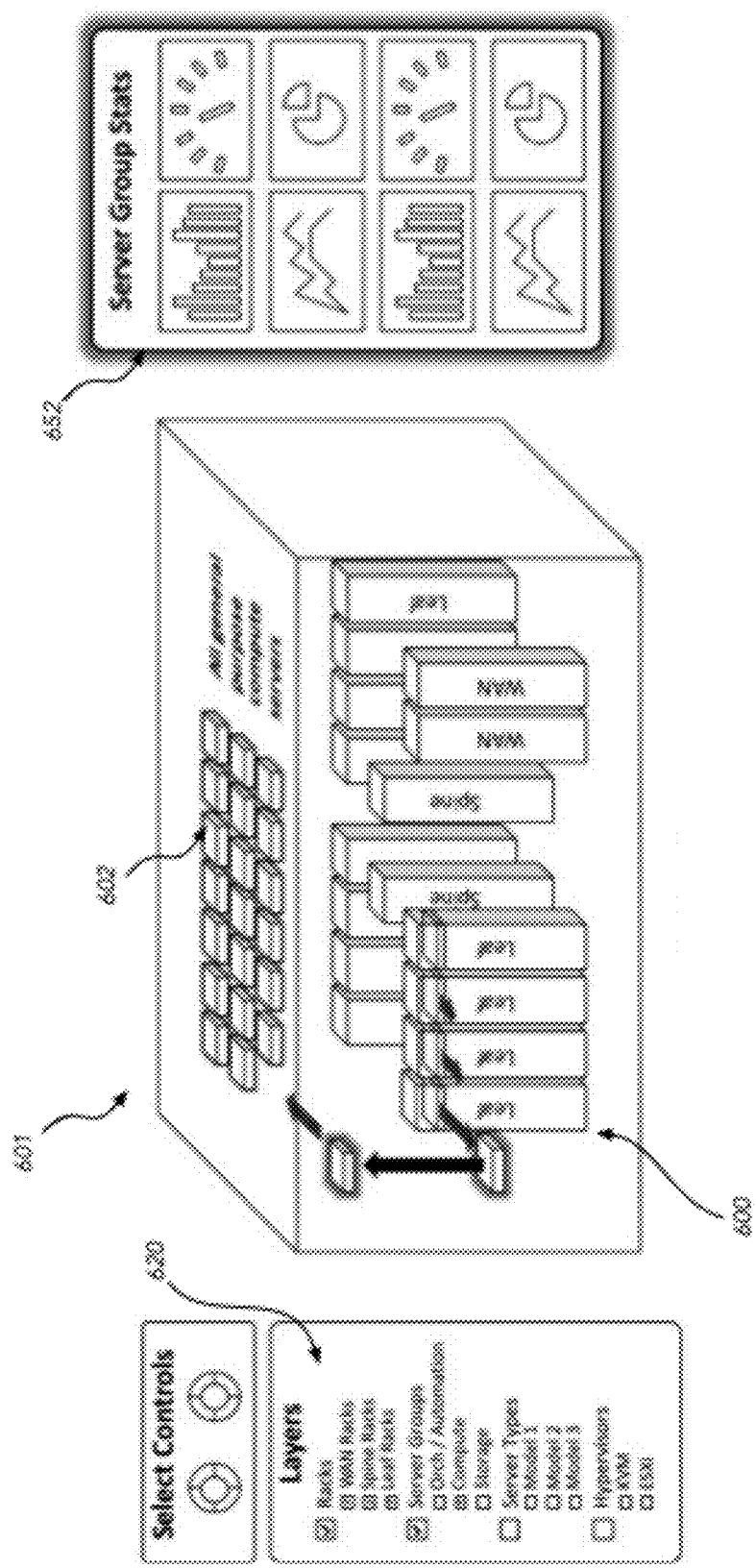

FIG. 6B illustrates how the system and method can isolate or indicate or make visible to the user all of the general-purpose computing servers in the system or a given portion of the system. The interface, model and output displays are configured and arranged by executing instructions therein to render the general-purpose computer servers 602 from among the computing assets 600 described before. In some aspects, these are animated and pulled out so as to clearly show them to the user.

Figure 6C:
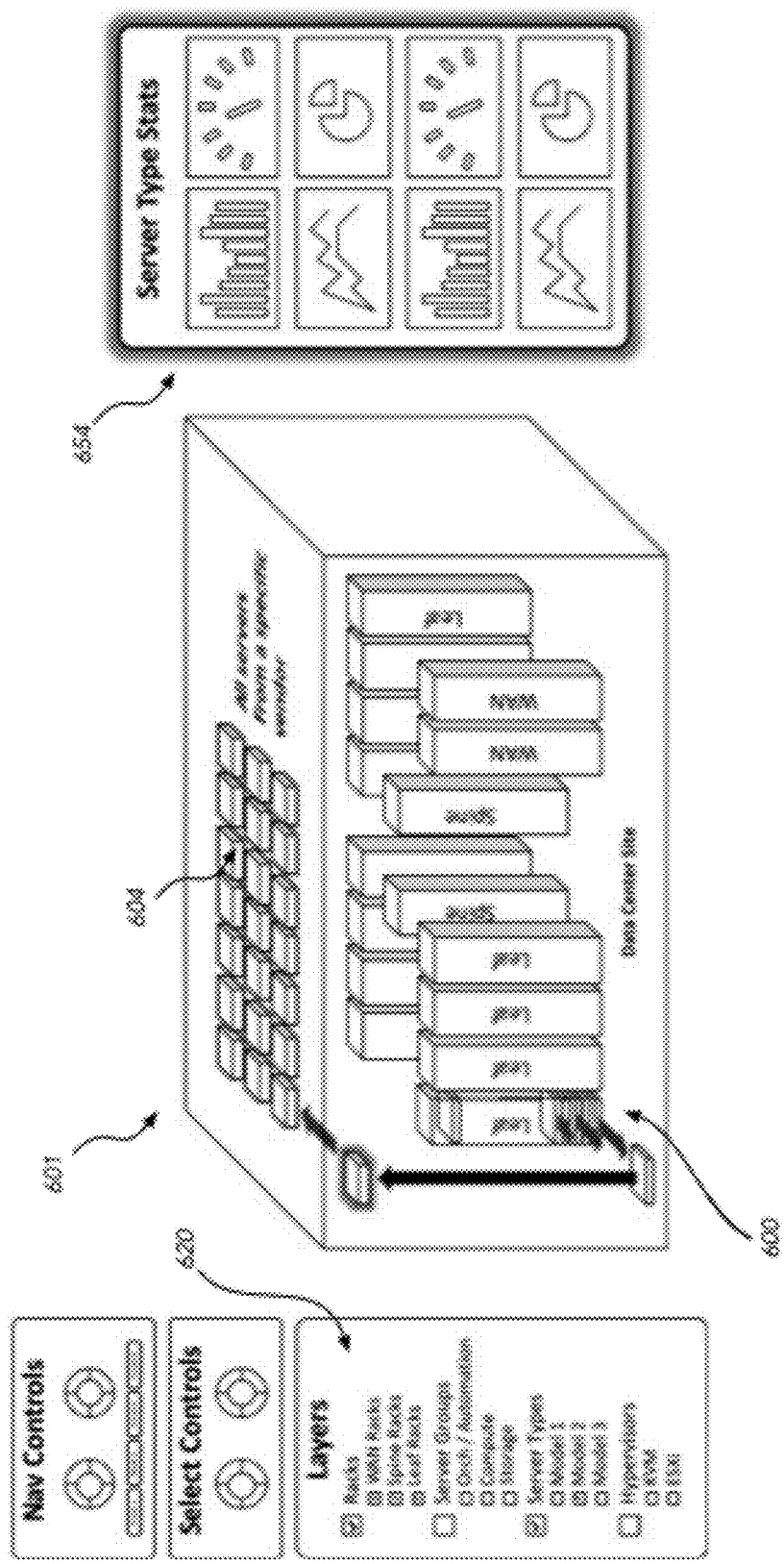

FIG. 6C illustrates how the system and method can choose to isolate and display all computing resources 604 (e.g., servers 602) from a given vendor in site view 601, or all servers or assets that are of a specific model as selected in control panel 620.

Figure 6D:
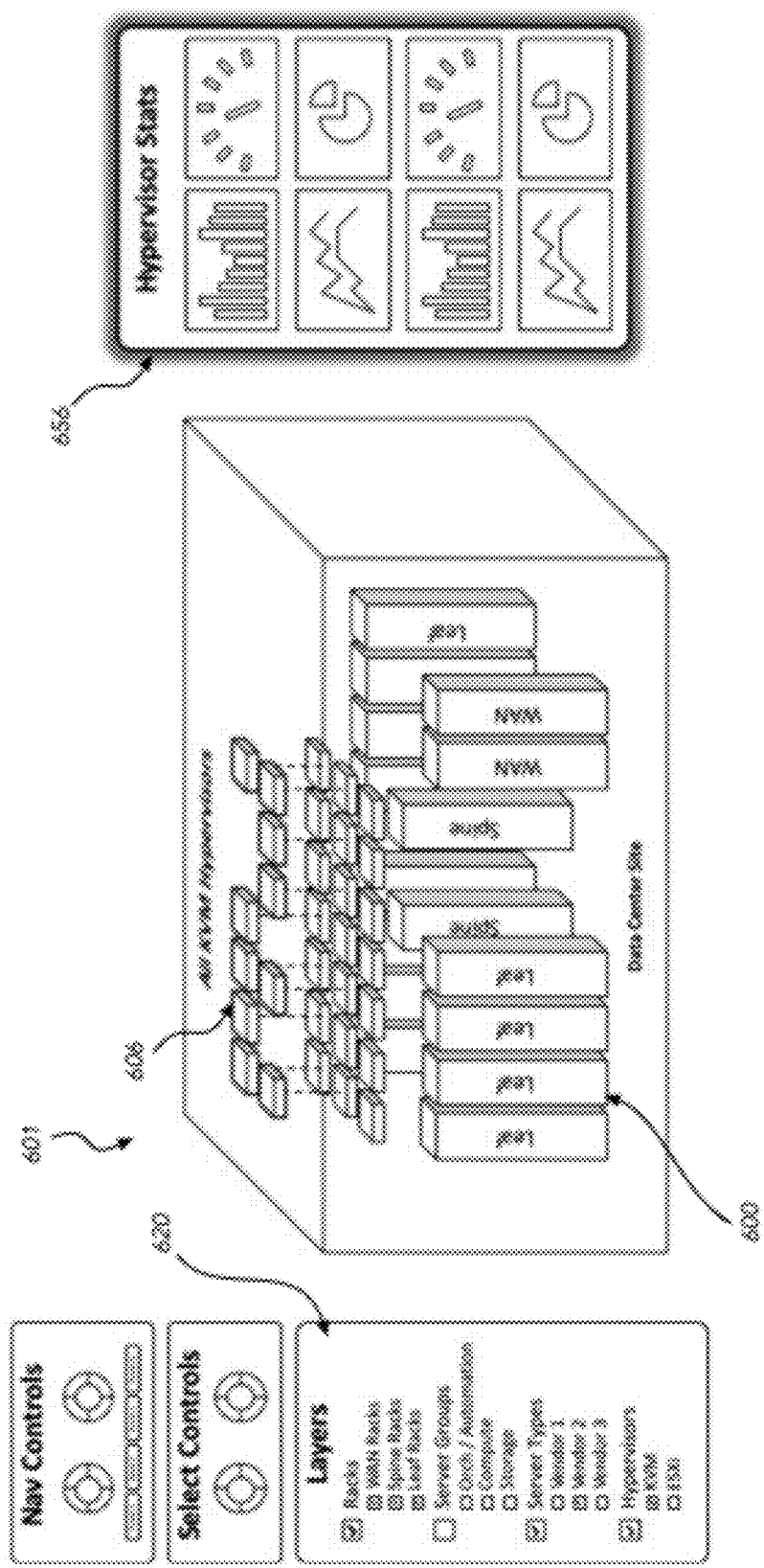

FIG. 6D illustrates an example site view 601 with a hypervisor statistics panel 656 and associated special hardware and/or software for implementing a virtual server resource which can be referred to herein as a hypervisor 606 isolated or visually distinguished in their respective layer. In one instance, the hypervisor comprises a special set of machine-readable instructions executable on a processor causing said processor (e.g. in a server) to effectively become and operate as a virtual server (be virtualized). In another instance, the hypervisor may comprise a kernel-based virtual machine. In one embodiment, a user can select which hypervisor(s) are visible on a user interface using a filter panel or control panel 620.

In some or all of the present examples, the system and method can implement the identification and illustration of the chosen assets using a model-driven object animation according to optional embodiments of the present system and method. Here, the multitude of servers (or other resources) are depicted as the system animates their extraction from their respective server racks. In this non-limiting example, the servers are set out visually above the server racks for simplicity and clarity, but other illustrative depictions are equally possible and valid. In this example, an operator has chosen certain characteristics, attributes or features of the system that are desired to be reviewed. Only the servers associated with the selected attributes are animated to be pulled out from their racks and laid out.

Figure 7:
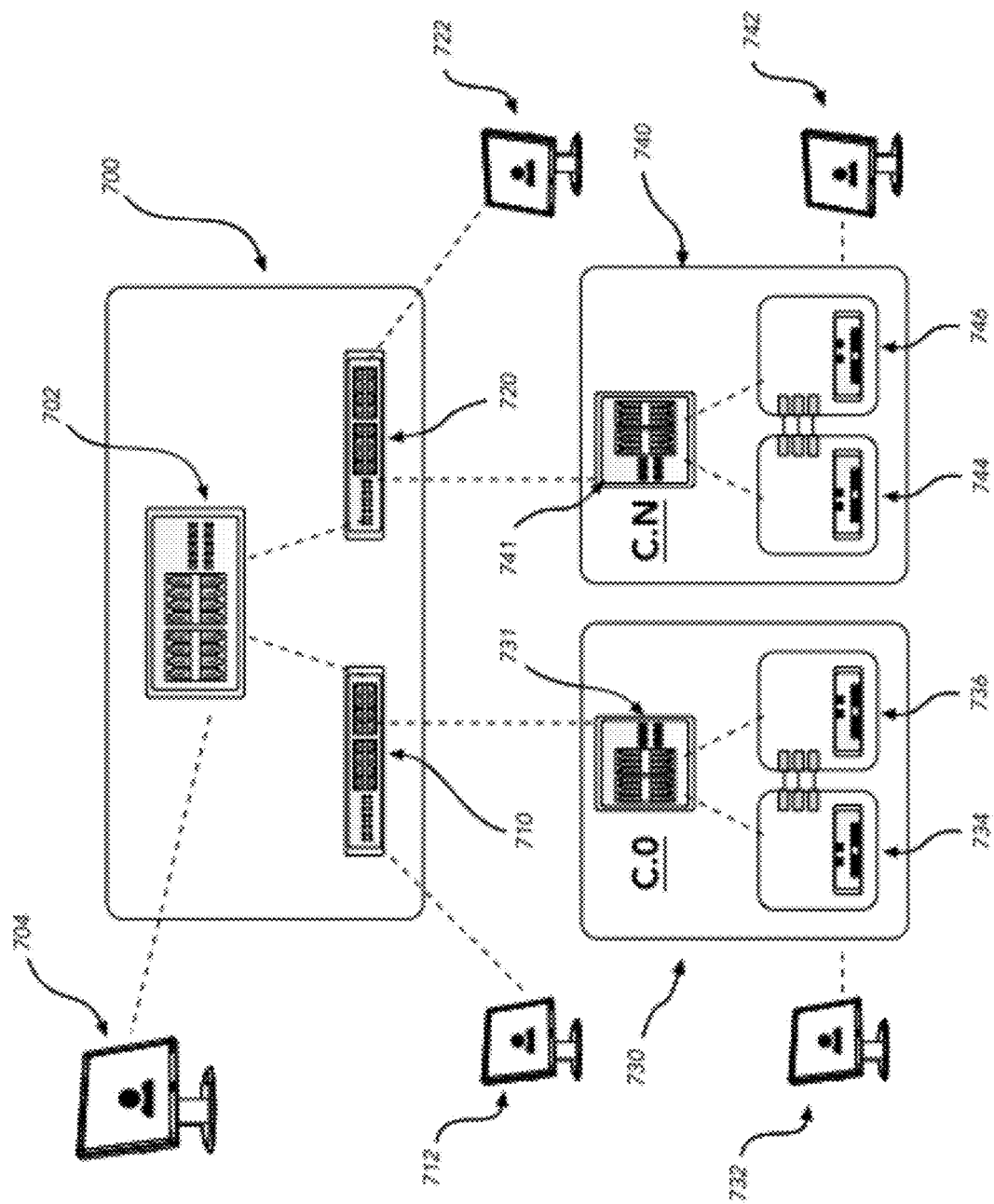
FIG. 7 illustrates an example architecture.

As depicted in FIG. 7, the present invention provides, inter alia, a distributed network automation infrastructure and method that simplifies the integration, packaging, deployment and operation of end-to-end solutions. The solutions may be organized as a distributed automation framework designed to run as a hierarchy of nodes that leverage a common data model. The node hierarchy acts as a unified system with a common API and modular web user interface that can be hosted in public clouds or as an air-gapped implementation on a customer site. The grouped account manager components may be operated and accessed by the owner or operator of the present architecture, which is used by a plurality of customers (C.0, . . . , C.N). Each customer may also have settings and features activated and set up to the customer's needs and may be operated by information technology (IT) personnel of the respective customer. The customers are thus sometimes considered or set up as tenants in this architecture. It is understood that one or a plurality of such tenants can be managed by the present system and method.

In the example of FIG. 7 an online account management system 700 having a customer C.0 administration server 710 coupled over a data communication network to customer C.0 tenant architecture 730. Account management is possible from control panels, interfaces or consoles 704, 712, 722. Customer C.0 tenant architecture 730 in turn comprises a local instance tenant account server 731 and a front end 734 and back end 736 of the local instance for tenant customer C.0. Similar connections and hardware and executable instruction sets are implemented for each other customer C.1, C.2, . . . , C.N. For example, a customer C.N administration server 720 is coupled over a data communication network to customer C.N tenant architecture 740. Account management is possible from control panels, interfaces or consoles 704, 722, 742. Customer C.N tenant architecture 740 in turn comprises a local instance tenant account server 741 and a front end 744 and back end 746 of the local instance for tenant customer C.N. The client tenants themselves can observe and control aspects of the local instance architectures through terminals or consoles 732-742.

In an aspect, the present architecture comprises a front-end and back-end framework as mentioned above. A central site implementation is broken into a set of front-end and back-end components. The front-end consists of the web server framework, user authentication framework (and fulfills a portion of the security architecture related to securing browser sessions and user credential information). A back-end framework hosts the system object model. The object model can leverage a relational database (RDB) implementation and can include a database abstraction layer (DBAL).

The DBAL allows the object model and schema to be automatically rendered onto various types of databases for varying size, performance and scalability requirements. The DBAL uses an API gateway implementation to expose a northbound interface (NBI) that supports a variety of client types and enforces API endpoint security. It should be understood that the foregoing examples are merely illustrative, and the overall invention and disclosure are not intended to be limited by these examples. Those skilled in the art will appreciate in each of the illustrative examples and embodiments described that other equivalent or substitute embodiments and examples are equally valid and comprehended by this disclosure.

Still other aspects of the present architecture employ a transactional workflow engine operating in conjunction with the RDB to perform system actions. The workflow engine is model driven with a workflow schema that defines workflow steps and stages. Workflow steps consist of objects (and their modeled attributes) in conjunction with a set of actions. Workflow actions are also stored in the model and can consist of a variety of simple or complex operations. These operations can be defined or categorized in a number of ways, for example as: directly mapped attributes; derived attribute values; simple Boolean logic operations; complex arithmetic operations; regular expressions; If-then operations; do-while loop expressions; custom functions; user-input data; web user-interface (UI) interactions; events and notifications; and failure remediation actions. Those skilled in the art will appreciate that these categories can be generalized or defined differently and are thus provided for the sake of illustration and not limitation.

In one or more embodiments, Workflow stages are grouped collections of workflow steps. Workflow steps and stages are composed either using a set of API calls or visually using the web UI.

Figure 8:
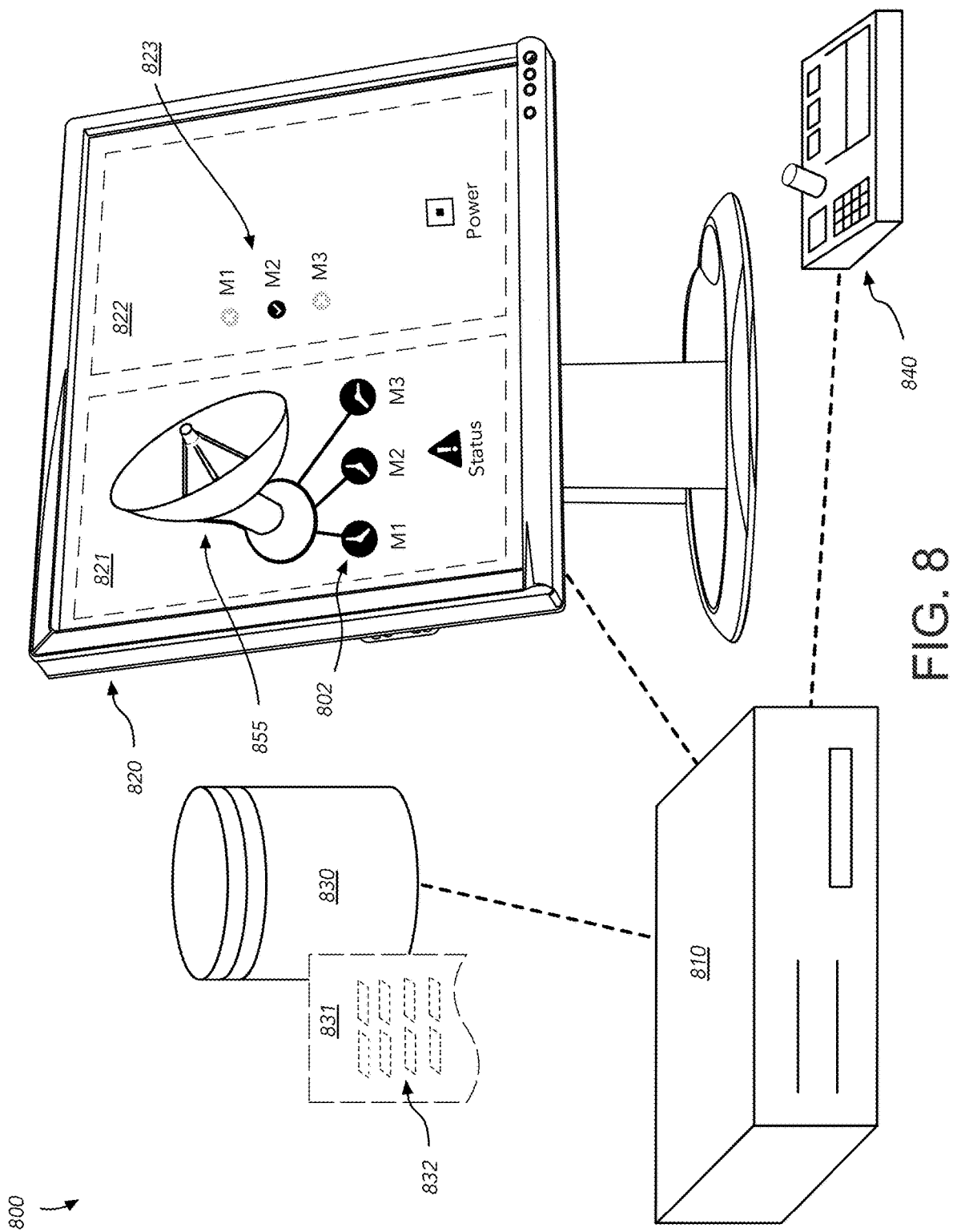
FIG. 8 illustrates a computer system according to an embodiment.

FIG. 8 illustrates a computer system 800 that in some examples has been referred to herein as a console. The console, as stated, can be of any suitable computing machine format such as a desktop computer, server, mobile computing device, laptop, tablet or other specialty computing equipment having one or more processor units 810 including a graphics processing unit and a central processing unit; a user interface controller or device 840 such as a keyboard and/or mouse, joystick, trackball, or other input apparatus; a visual display screen 820 such as a computer monitor; a data storage unit, database, or other information storage unit referred to herein generally as a data store 830. The console 800 may also include other ancillary operational components as would be understood by one skilled in the art, including but not limited to a power supply (AC or DC), a communications unit such as a data communications modem, and so on. The console 800 is specially configured and arranged according to the present disclosure and is capable of storing, reading and executing machine-readable instructions in its processor(s) 810 and rendering visible outputs on its display screen 820 according to the present disclosure. The resulting configuration and functioning of the console 800, especially in the context of the present network and networked assets and other features, provides new and novel functions and performance advantages not previously known or possible in the art.

The foregoing specifically illustrates a powerful aspect of the invention. We see that data store 830 can store information in the form of data 831, which may be organized into a table, database or relational information structure, and which relates to a state of one or more networked physical assets in the field as mentioned before. The stored data 831 includes specifically encoded information, values or parameters indicating the condition or state of various aspects of the monitored and controlled physical assets. Changes in the condition of one or more assets or features or parameters of the assets are reflected in said database in datastore 830.

Furthermore, the display screen 820 of console 800 displays modeled and rendered graphical asset representations 855 of one or more of said networked physical assets. For example, the display 820 includes a portion of said display 821 dedicated to showing the condition and status of asset corresponding to rendered graphical asset representation 855. The asset, as stated before, may be rendered in any degree of realism or physically-appropriate depiction of the actual asset being represented. Additionally, one or more monitored or controlled features of the asset may be shown for an operator and may selectably displayed in portion 821. Yet further, display screen 820 may include another portion 822 dedicated for user interface tools and controls. These user interface tools and controls can be graphical user interface widgets such as buttons, data entry boxes, menus, and so on used to cause a change the configuration of a controlled physical asset. Again, if an operator changes a parameter or controllable feature of a controlled asset, a corresponding update to the information 832 in table or data structure 831 is recorded in data store 830. Data store 830 is not necessarily contained in or exclusively associated with one console but may in some embodiments be distributed or associated with a server coupled to a same network as the console or consoles. The data 831 is in the end accessible as necessary by the console(s) so as to achieve the above functionality. Those skilled in the art will understand that this functionality can be implemented in more than one unique way, for example using networked components, grouped components, client-server systems, cloud-based systems, and others.

In some aspects, the graphical representation in section 821 of display 820 and the user control section 822 of display 820 are associated or married through rendering software and hardware running on processor(s) 810 of console 800. In one non-limiting example, a substantial footprint or area 821 of the surface of display screen 820 is allocated to displaying the one or more physical asset representations 855 and their status 802 while a correlated and corresponding substantial footprint or area 822 of display screen 820 is allocated to displaying the user interface tools associated with the selectable controllable features 823 of said one or more physical assets in question. So, on one screen 820, a console user can see (1) the state of and a model-generated pictorial representation (preferably gaming-quality realistic 3D vector graphical representation) of one or more physical assets and their state/status as well as (2) a group of model-generated interactive user interface tools or widgets 823 made to correspond to the controllable features of the physical asset(s), wherein both the displayed condition of the asset(s) and the user interface tools correspond to respective data in a dataset stored in a data store available to the console. The same dataset preferably keeps the information or data describing the state and controllable features of the asset(s) as well as any parameters or values used in controlling the asset(s) from the console over said network. Additional details regarding the graphical representation and/or other features are disclosed in U.S. Pat. No. 11,012,320, titled "Interactive Model-Based Monitoring and Control of Networked Physical Assets," issued on May 18, 2021, which is hereby incorporated by reference.

As mentioned earlier, the models for generating the views of the rendered assets can be high-quality models such as generated by gaming-ready hardware and software and in some cases using modified implementations of gaming graphics hardware and software suited for the present purpose. The rendered 3D representations of the present assets are not merely stored images of a same or similar asset (for example, if the asset is a vehicle, the present system generates and provides a rendered model of such a vehicle and not just a stored picture of a vehicle).

In some aspects, the rendered physical asset is rendered to show an actual condition of the asset. For example, if a satellite communication dish is the networked physical asset, the satellite communication dish may be rendered and displayed, using a graphics model and resources, so as to indicate the asset's actual elevation angle, azimuthal position, or other aspect of the asset. In another example, if the asset is a piece of computing hardware with LED indicator lights on its control panel or front or back interface (in real life) then the invention may use the graphics capabilities of the console to generate and display a real-time or near-real-time representation of the same or similar piece of equipment including the state (on/off, color) of any such indicator lights. This greatly assists a console user in quickly visually observing an accurate state of the asset, instead of reading the asset's condition for example from a generated spreadsheet or text output. An operator who is used to touching and operating a physical asset locally can use the present system and method to remotely operate the asset with near or same level of ease because the indications and controls of the asset are in some embodiments mirrored in the graphical representations of the present invention.

It is to be understood that the present exemplary outputs and illustrations are only provided to show the reader examples of the many available and possible uses and instances of the invention. Those skilled in the art will appreciate the many other examples of input/output, control, interface and presentation formats and features possible using the invention.

In a networked system, the workflow engine, change set manager, statistics/events/notifications/faults and logging subsystems can be replicated at remote sites. Because the entire system runs as a set of loosely-coupled microservices packaged and orchestrated as a set of containers they can be deployed in several different form factors. At a cloud site the remote automation framework bundle can be natively deployed as a container. Within a data center the remote automation framework bundle can be deployed as a container on a VM or on bare metal. At remote sites, the remote automation bundle may be deployed as a container on a server cartridge or on a standalone micro-host.

A non-limiting exemplary embodiment provides efficient form factor remote computing modules (sometimes referred to by the present inventors as compute sticks) into the management switch at a remote site. This can be deployed in multiple alternative ways, including for example: 1) As a temporary host to perform one-time workflows to bootstrap or upgrade a site. 2) As a permanently deployed solution to act as an out-of-band automation network for ongoing automation workflows and to operationally manage full solution stacks or monitor then for service assurance use cases. The hardware footprint (and container cluster dimensioning) at any given site will determine the complexity of automation work that may be accomplished at a site and the automation solution's performance envelope and scalability.

The present system and method also provide automation adapters in some embodiments. Remote site automation nodes provide a southbound abstraction layer defined as a variety of adapters to third party hardware and software, and may be applied to a variety of applications, including for example to: Custom hardware devices; Operating systems; Container frameworks; Configuration databases; Logging frameworks; AAA systems; Off-the-shelf servers; Virtualization frameworks; Public cloud APIs; Message buses; Time-series databases; and Custom applications.

An adapter may be a separate model with its own schema. The schema for an adapter is specific to the interface of a third-party component or user. Therefore, a variety of adapter models are possible and might represent RESTful API calls, Netconf/Yang models, web sockets, CLI commands or RPC calls as examples.

Therefore, the present system and method can provide interactive model-driven monitoring and control environments to operators of complex networked systems. The systems and methods include model driven geographic or physical environment scenes available on game-quality hardware and graphical systems running game-quality software and rendering and modeling software.

As mentioned, the invention may be organized into a "front end" and a "back end" or combinations of such architectures. Applications range as described above but can include monitoring and control of 5G communications assets and systems and allows the servicing and activation of assets within the system. Some features allow for moving assets in networked systems towards or to the edge of said networks.

The geographic and physical environments (indoor, outdoor) have been demonstrated by the present applicants based on open source map technology (e.g., map client) combined with game graphics technology to deliver previously-unknown and highly effective system monitoring and control. The assets of the systems being monitored and controlled are sometimes provided using map and asset layers and usable with simple (e.g., Web browser) tools by the end users or operators.

An instance of a software asset or application can be initiated or terminated by an operator using highly organized and detailed menus or other user-driven interfaces. In some aspect the interfaces highly resemble their actual physical counterparts such as by depicting the physical layout or controls panels of hardware resources represented in the interface. In other instances, the application code can be moved using the system and method.

The system and method can further include a Changeset Manager to manage, process, and/or implement configuration changes to one or more networked physical assets. The Changeset Manager can include computer-readable instructions that can be executed by the console processor (e.g., processor 224, 810). In an embodiment, the Changeset Manager can group one or more draft configuration changes and can process the group of draft configuration changes together. Grouping of the draft configuration changes can be done manually (e.g., based on the user designating which change(s) to group together). Additionally or alternatively, the Changeset Manager can automatically group some or all of the draft configuration changes. Examples of draft configuration changes include, but are not limited to, adding new physical assets (e.g., objects), changing the settings, configurations, and/or features of existing physical assets, and/or deleting existing physical assets. The group of draft configuration changes can be order-dependent and/or can include a sequence of configuration changes. A user can input the draft configuration changes using a console computer (e.g., computer 220, 800).

Due to the large number of physical assets being managed, the complexity of the network, the large size and/or distribution of the network, and/or the criticality of the physical assets, it may be desirable to determine whether any of draft configuration changes may have a negative impact on the network, on the physical asset having the configuration change(s), and/or on other physical assets. For example, changing the configuration of a wireless router can negatively impact the devices that are connected to the wireless router. The potential negative impact can be magnified when multiple configuration changes are implemented and/or when the physical assets are critical for the infrastructure of a business or government. For example, implementing configuration changes for a communication satellite that may be critical for a business has a higher potential negative impact than implementing configuration changes for an individual laptop or server especially when redundant physical assets are available.

The Changeset Manager can include a library of logical configuration change rules. The logical configuration change rules can define the configuration changes that are allowable relative to the existing state (e.g., configuration, on/off state, connectivity state, etc.) of the physical assets and/or of the local or wide-area network. The existing state of the physical assets is reflected in the database (e.g., RDB) that is accessible to the console. The logical configuration change rules can be different than rules-based access control (RBAC) that define the configuration changes that are allowable by each user.

Prior to implementing the group of draft configuration changes, the Changeset Manager can determine and/or evaluate (a) whether the user is authorized to make the draft configuration changes (e.g., based on RBAC) and (b) whether each draft configuration change violates any of the logical configuration change rules. If a draft configuration change violates one or more logical configuration change rules, the Changeset Manager can identify the draft change and indicate which logical configuration change rule(s) the draft change would violate. When the Changeset Manager identifies a logical configuration change rule violation, the Changeset Manager can cause the console to graphically identify the logical configuration change rule violation and the draft change that caused the logical configuration change rule violation. For example, the Changeset Manager can cause the console to update the map layer 301, site layer 401, application layer 501, and/or display screen 820 to graphically represent the target physical asset for the draft change (e.g., networked resource 440, 855), the network connection(s) that would be negatively affected by the draft change, and/or the physical assets that would be negatively affected by the draft change. The graphical representation can include changing the color, adding an icon, and/or another graphical representation.

The Changeset Manager then provides the user with an opportunity to make modifications to the group of draft configuration changes to correct the logical configuration change rule violation(s). After the group of draft configuration changes is modified, the Changeset Manager determines and/or evaluates (a) whether the user is authorized to make the draft configuration changes as modified (e.g., based on RBAC) and (b) whether each draft configuration change violates any of the logical configuration change rules. If there are no logical configuration change rule violations, the Changeset Manager allows the user to implement the draft configuration changes. Otherwise, the Changeset Manager causes the console to graphically identify the logical configuration change rule violation and the draft change that caused the logical configuration change rule violation, as discussed above.

Figure 9:
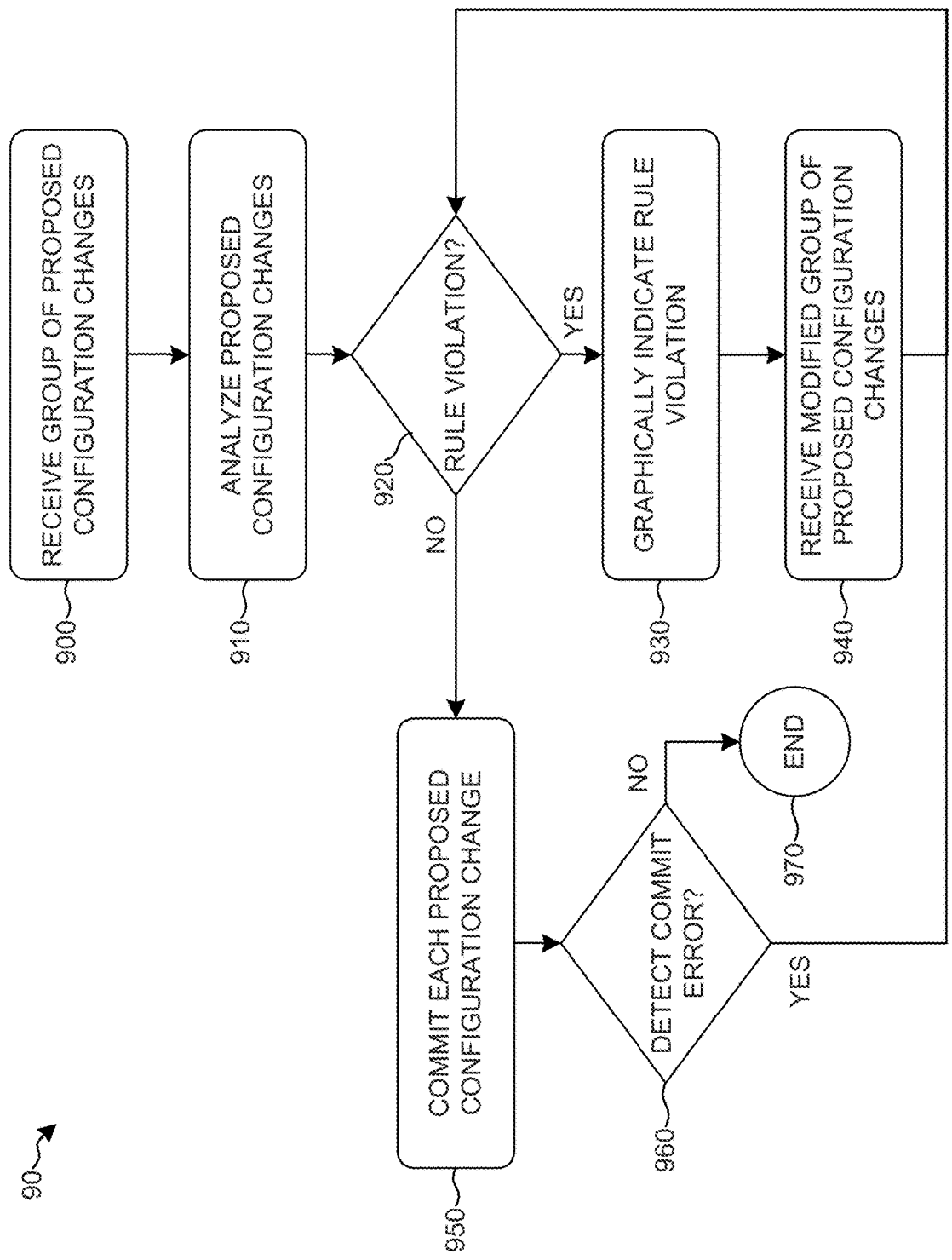
FIG. 9 is a flow chart that illustrates the operation of the Changeset Manager according to an embodiment.

FIG. 9 is a flow chart 90 that illustrates the operation of the Changeset Manager according to an embodiment. In step 900, the Changeset Manager receives a group of draft configuration changes from a user using a console computer (e.g., computer 220, 800). The Changeset Manager can run on the console computer or on another computer (e.g., a server, a desktop computer, or other computer) in network communication with the console computer. The draft configuration changes can include adding new physical assets (e.g., objects), changing the settings, configurations, and/or features of existing physical assets, and/or deleting existing physical assets.

In step 910, the Changeset Manager analyzes the draft configuration changes to determine if any draft configuration change violates a logical configuration change rule. Analyzing the draft configuration change can also include determining whether the user is authorized to make each draft configuration change (e.g., based on RBAC).

Figure 10:
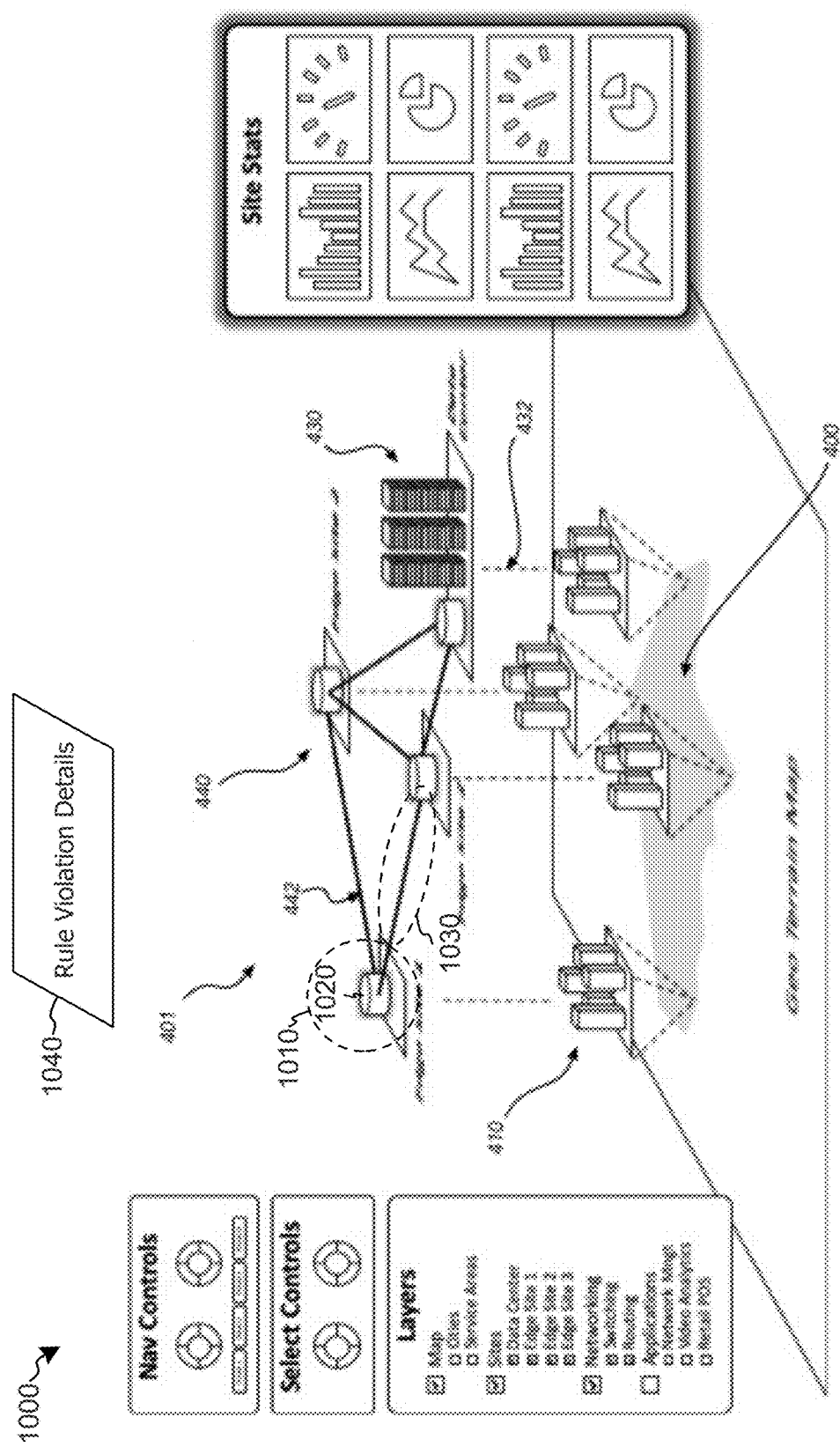
FIGS. 10 and 11 are graphical illustrations of a rule violation according to an embodiment.

If any of the draft configuration changes violates a logical configuration change rule and/or if the user is not authorized to implement any of the draft configuration changes (i.e., step 920=YES), the flow chart 90 proceeds to step 930 where the Changeset Manager updates a graphical representation of at least a portion of the network to graphically indicate the rule violation(s). For example, a rule violation can be illustrated in map view 401 by placing a circle 1010 on a physical asset 1020, as illustrated in updated map view 1000 in FIG. 10. Physical asset 1020 can represent the target physical asset for the configuration change and/or the physical asset that would be negatively impacted by the draft configuration change. Additionally or alternatively, a circle 1030 can be placed on a logical or network connection 442 that would be negatively impacted by the draft configuration change. Other graphical representations can be used to graphically illustrate the rule violation in other embodiments. A rule violation dialog box or panel 1040 can be displayed with details regarding the draft configuration change(s) that caused the rule violation(s). The contents of the rule violation dialog box can change when the user selects each circle 1010, 1030.

Figure 11:
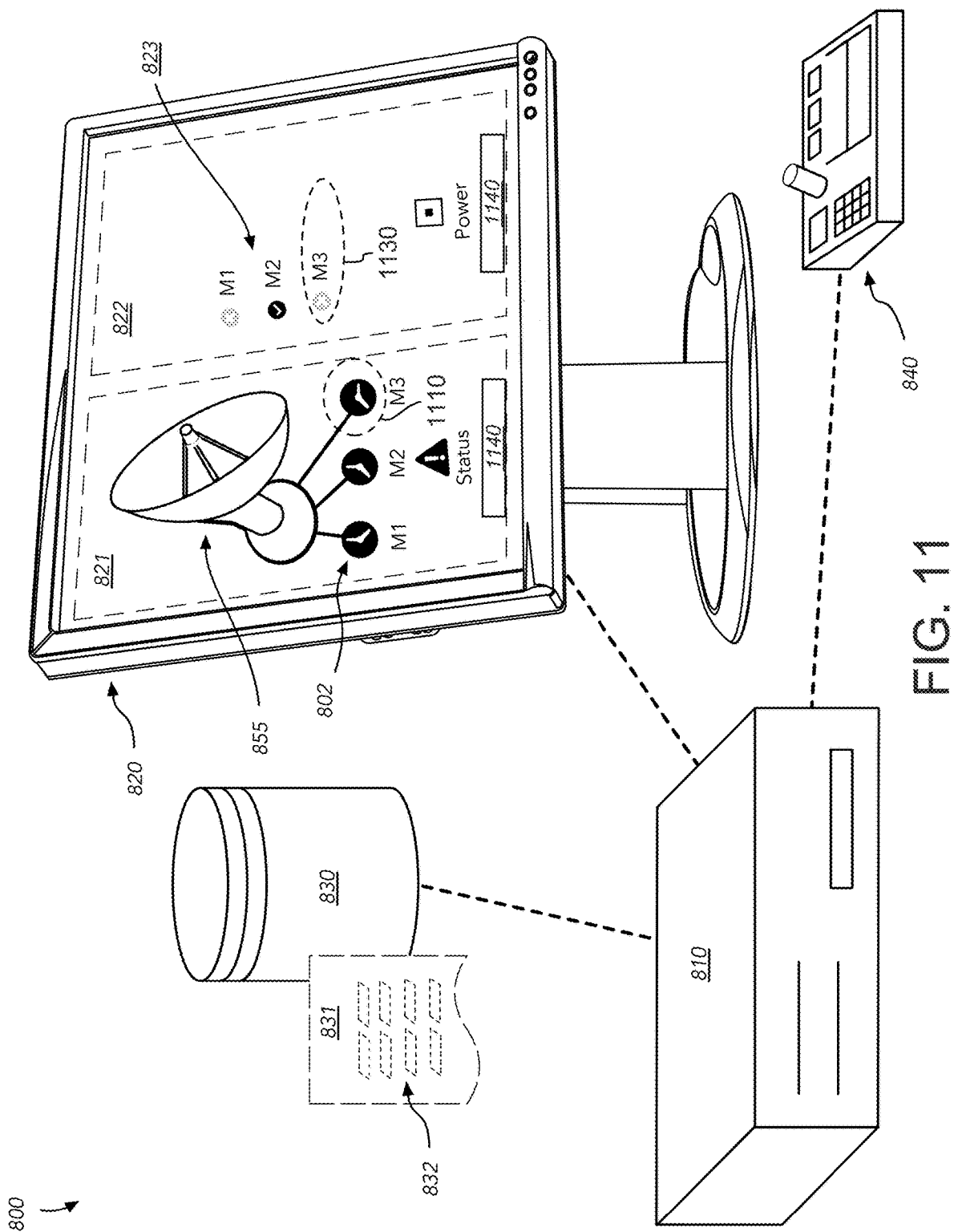

Additionally or alternatively, the rule violation can be graphically illustrated in screen 820, such as by graphically updating the status 802 or the selectable controllable feature(s) 823 whose configuration change caused the rule violation, such as by placing respective circles 1110, 1130 thereon, as illustrated in FIG. 11. Other graphical representations can be used to graphically illustrate the rule violation in other embodiments. Audio and/or other feedback can also be used to indicate rule violations. A rule violation dialog box or panel 1140 can be displayed in one or both display portions 821, 822 with details regarding the draft configuration change(s) that caused the rule violation(s).

Returning to FIG. 9, after graphically indicating the rule violation in step 930, the Changeset Manager provides the user with the opportunity to modify the draft configuration change which is received in step 940. Next, flow chart 90 returns to step 920 where the Changeset Manager returns evaluates the modified group of draft configuration changes for any rule violations. The loop of steps 920, 930, and 940 is repeated until there are no rule violations.

When there are no rule violations, the group of draft configuration changes can be implemented or committed in step 950. Implementing the draft configuration changes can include sending appropriate commands (e.g., from the computer) over the network to the relevant physical assets to change one or more settings or configurations according to the draft configuration changes. Implementing the draft configuration changes can also include updating the database (e.g., RDB) to reflect that the draft configuration changes have been implemented.

In some embodiments, a commit error can occur during step 950. A commit error can occur when a physical asset does not respond to or acknowledge a draft configuration change. In some embodiments, a commit error can occur when one or more of the draft configuration changes is/are invalid. Additionally or alternatively, a commit error can occur when the database (e.g., RDB) it not accessible. Additionally or alternatively, a commit error can occur when the physical asset is offline or in another state in which the physical asset cannot respond to or acknowledge a draft configuration change. Additionally or alternatively, a commit error can occur when the physical asset has a processing error when attempting to apply a draft configuration change.

If the computer detects a commit error in step 960, flow chart 90 proceeds to step 920 and will treat the commit error as a configuration change rule violation, which can be graphically indicated in step 930 and the draft configuration change can be modified in step 940. If the computer does not detect a commit error in step 960, flow chart 90 ends at step 970.

Figure 12:
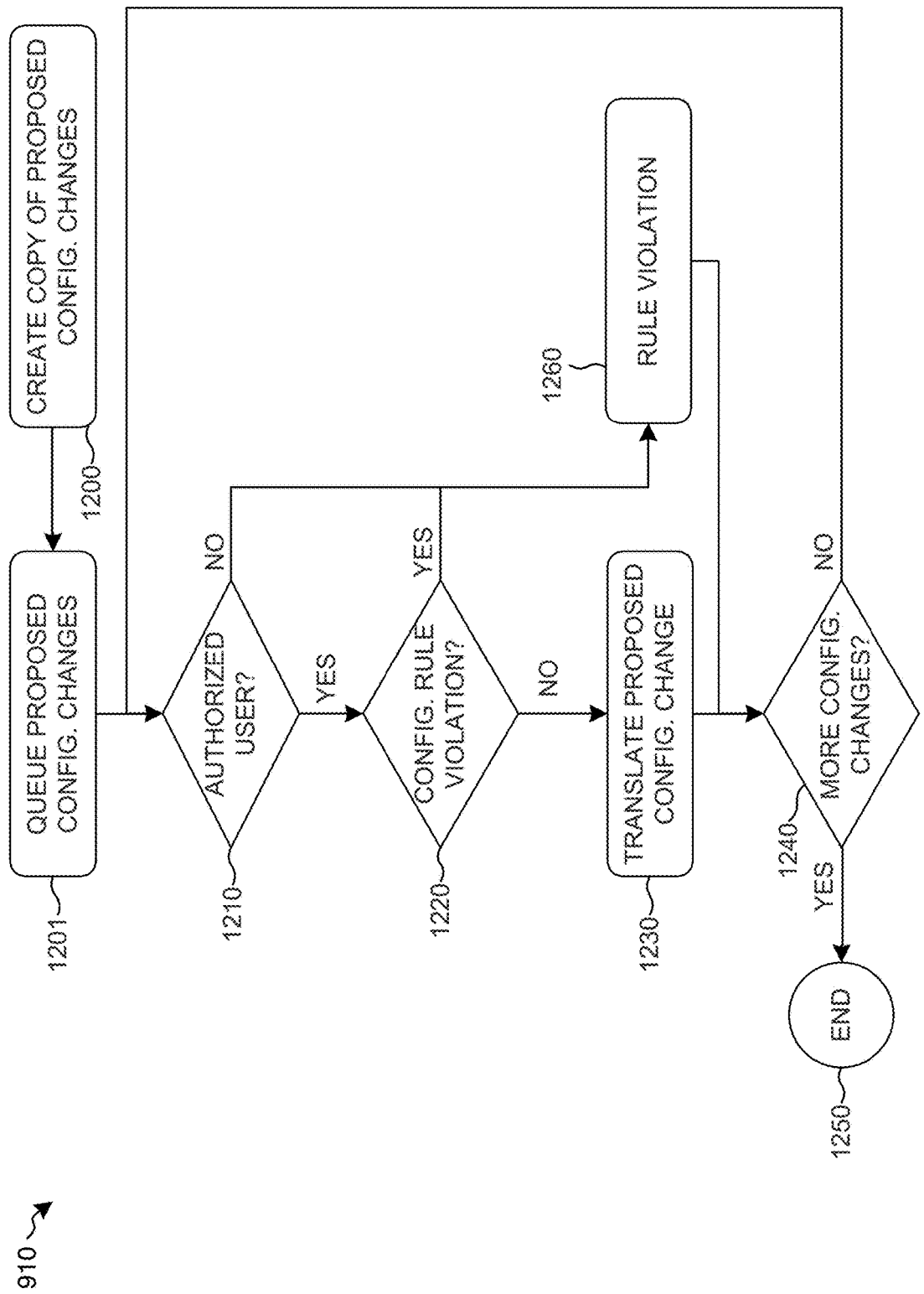
FIG. 12 is a flow chart that provides additional details of step 910 in FIG. 9 according to an embodiment.

FIG. 12 is a flow chart that provides additional details of step 910 in FIG. 9 according to an embodiment. In step 1200, the group of draft configuration changes is optionally copied and stored in accessible memory. The copy can also include a copy of the database (e.g., RDB) which includes the current state of the physical assets. The copy of the draft configuration changes can be used for debugging to determine what configuration changes have been made. In addition, it can be used to roll back the configuration to the current network configuration after the group of draft configuration changes is implemented or committed.

In step 1201, the group of draft configuration changes is queued for analysis by the Changeset Manager. Each draft configuration change is analyzed separately (e.g., serially) and in the order in which the draft configuration changes are grouped. In step 1210, the Changeset Manager determines if the user is authorized to make the first draft configuration change.

For existing physical assets, a draft configuration change can include the identity of the target physical asset (e.g., by media access control (MAC) address), the setting, parameter, or configuration to be modified, and the target value or state of the setting, parameter, or configuration. For new assets, a draft configuration change can include the type or class of the new physical asset and the identity of the new target physical asset (e.g., by media access control (MAC) address). The user may be authorized based on his/her user credentials which may be controlled by a network administrator, a supervisor, and/or another user of the network. The user credentials can be stored in a database or another memory location that is accessible to the console computer. The credentials can include authorization for the user to change the configuration of certain types or classes of physical assets (e.g., servers, laptops, satellites, routers, etc.) and/or specific physical assets (e.g., identified by MAC address). Additionally or alternatively, the credentials can include a list of certain types/lasses of physical assets and/or specific physical assets that are not accessible to the user for configuration changes. The credentials can also include authorization or lack of authorization to add new physical assets to the network.

If the user is authorized to make the draft configuration change in step 1210, the Changeset Manager determines if the draft configuration change violates any of the logical configuration change rules. The logical configuration change rules can be based on a data model of each type/class of physical asset. The data model can describe the hardware, software (e.g., operating system, applications, etc.), data inputs and outputs, and any settings, parameters, and/or configurations that can be modified. The data model can also identify the permissible settings, parameters, and/or configurations for the type/class of physical asset and/or the permissible setting, parameter, and/or configuration changes for the type/class of physical asset. The permissible setting, parameter, and/or configuration changes can be relative or order-specific. In addition, the permissible setting, parameter, and/or configuration changes can be related to other physical assets that are in network communication with the type/class of physical asset. For example, the permissible settings of a wireless router (e.g., turning off a wireless radio) may cause the wireless devices that are connected to the wireless router to become disconnected from the network.

If there is no logical configuration change rule violation, the Changeset Manager translates the draft configuration change, in step 1230, into a form that is accessible to the target physical asset. In some embodiments, the Changeset Manager can translate the draft configuration change using an adapter, which can be implemented in software and/or hardware. For example, the Changeset Manager can translate the draft configuration change into a format that is readable by the adapter. The adapter can be configured to translate the draft configuration change from a first format readable by the adapter and optionally by the Changeset Manager, to a second form readable by the target physical asset, such as by using a device specific protocol. The adapter can be specific to the type/class of physical asset. Examples of a device specific protocol include, but are not limited to, Netconf, XDR, and REST.

After the draft configuration change is translated in step 1230, the Changeset Manager determines, in step 1240, whether there are any additional draft configuration changes in the group of draft configuration changes. If so, the flow chart loops back to step 1210 to analyze the next draft configuration change. When all draft configuration changes in the group of draft configuration changes have been processed, the flow chart ends at 1250.

If either the user is not authorized to make the draft configuration change in step 1210 or the draft configuration change violates a logical configuration change rule in step 1220, the Changeset Manager determines that there is a configuration change rule violation in step 1260. After step 1260, the Changeset Manager determines whether there are any additional draft configuration changes in the group of draft configuration changes in step 1240, as discussed above.

The Changeset Manager can also be configured to rollback a configuration change group after it has been implemented or committed. This may be useful if there are unforeseen issues with the configuration change group which may not have been caught or anticipated by the logical configuration change rules.

Figure 13:
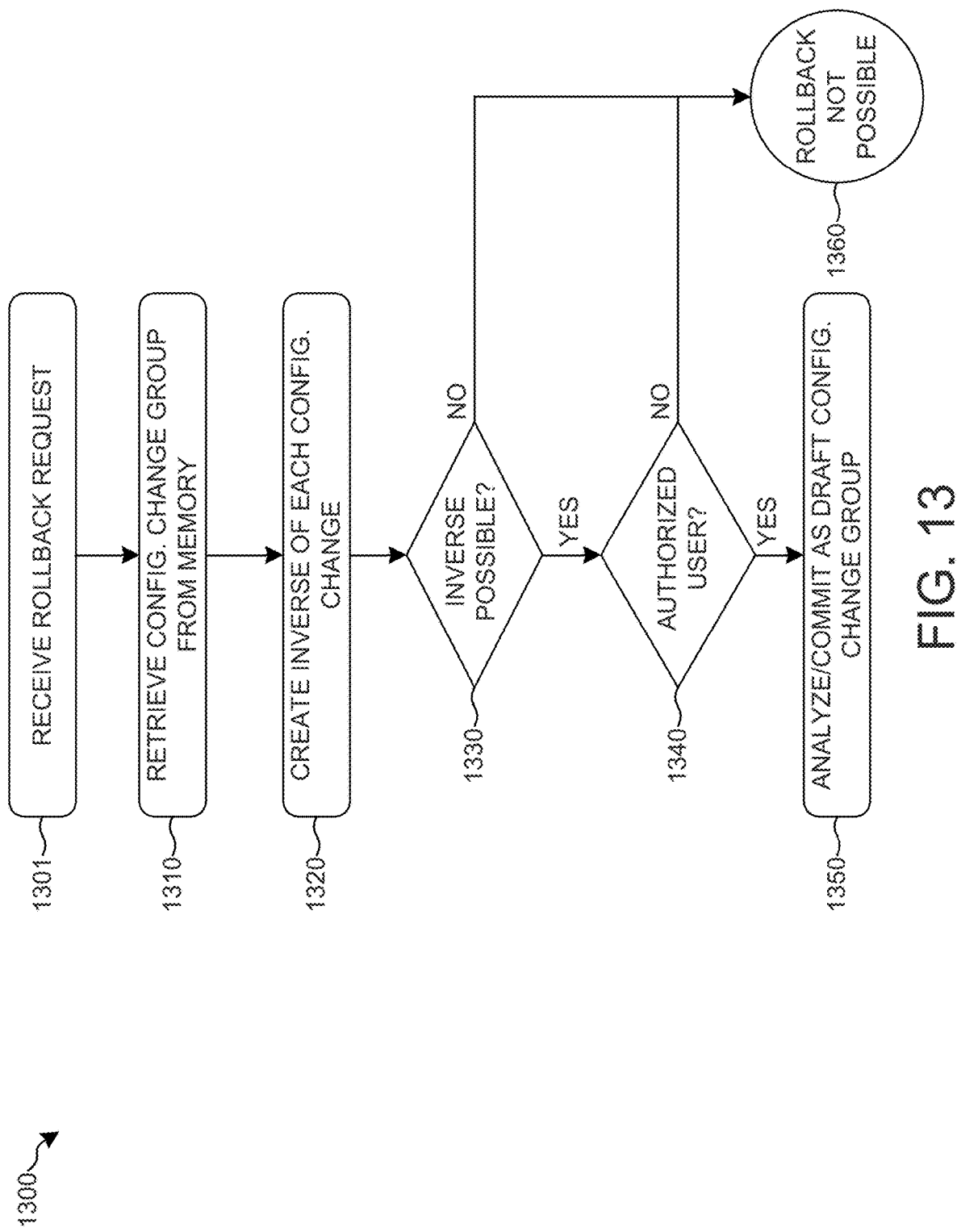
FIG. 13 is a flow chart of a method for rolling back a configuration change group according to an embodiment.

FIG. 13 is a flow chart 1300 of a method for rolling back a configuration change group according to an embodiment. In step 1301, the Changeset Manager receives a rollback request from a user. The rollback request can request the Changeset Manager to roll back or restore the configuration settings from the current or latest configuration settings to the last configuration settings. In some embodiments, the rollback request can request the Changeset Manager to roll back or restore any prior configuration setting, however the Changeset Manager rolls back all intermediate configuration settings in the reverse order in which they were applied.

In step 1310, the Changeset Manager retrieves a copy of the last configuration change group committed to the physical assets. The copy can be stored in computer-readable memory that is accessible to the console computer, such as internal memory, network-accessible memory (e.g., in a server), and/or external memory (e.g., flash drive). The copy of the last configuration change group committed to the physical assets can also include a copy of the physical asset configuration database as it existed before the last configuration change group committed was committed.

In step 1320, the Changeset Manager creates an inverse configuration change for each configuration change in the last configuration change group retrieved in step 1310. For example, if the last configuration change group included turning a WiFi radio off on a physical asset, the inverse configuration change would be to turn the WiFi radio on. Likewise, if the last configuration change group including rotating the azimuthal position of an antenna by +5° (e.g., in a first direction), the inverse configuration change would be to rotate the azimuthal position of the antenna by −5° (e.g., in a second direction that is opposite to the first direction). This process is repeated for each configuration change in the last configuration change group. In addition, the order of the configuration changes is reversed when creating the inverse configuration changes. For example, the first configuration change that was committed in the last configuration change group becomes the last inverse configuration change in an inverse configuration change group. Likewise, the last configuration change that was committed in the last configuration change group becomes the first inverse configuration change in the inverse configuration change group.

In step 1330, the Changeset Manager determines whether each inverse configuration change in the inverse configuration change group is possible. For example, the Changeset Manager can determine whether each inverse configuration change in the inverse configuration change group is reversible. An example of irreversible configuration changes includes deletion of data. If all inverse configuration changes are possible, the Changeset Manager determines whether the user is authorized to make each of the inverse configuration changes in step 1340 (e.g., based on RBAC). If the user is authorized to make all the inverse configuration changes, the Changeset Manager analyzes and processes the inverse configuration change group in the same way as a draft configuration change group, for example according to flow chart 80. However, if any inverse configuration change is not possible or if the user is not authorized to make any of the inverse configuration changes, the Changeset Manager will stop and rollback request and indicate that the rollback is not possible in step 1360. In some embodiments, the Changeset Manager can graphically indicate any inverse configuration changes that are not possible in the same or similar manner to how the Changeset Manager can graphically indicate a logical configuration rule violation (e.g., as discussed above and/or as illustrated in FIGS. 10 and 11).

The present invention should not be considered limited to the particular embodiments described above. Various modifications, equivalent processes, as well as numerous structures to which the present invention may be applicable, will be readily apparent to those skilled in the art to which the present invention is directed upon review of the present disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the present disclosure and claims include new and novel improvements to existing methods and technologies, which were not previously known nor implemented to achieve the useful results described above. Users of the present method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method for implementing changes to physical assets, comprising:

receiving a dataset at a console coupled to a data network, the dataset corresponding to a plurality of data-connected physical assets coupled to the data network, wherein each data-connected physical asset is associated with a respective feature set of the data-connected physical asset that can be monitored and controlled over said network using respective monitoring and control signals;

using a console graphics processing unit (GPU) in said console, generating a model-based three-dimensional vector graphics representation of said data-connected physical assets, along with respective states of said data-connected physical assets, based on respective data in said dataset;

on a console display screen in electrical communication with the console, displaying the model-based three-dimensional vector graphics representation of said data-connected physical assets, including displaying a state of a plurality of configuration settings of said data-connected physical assets;

using said console GPU, executing an interface abstraction layer to generate a plurality of model-based graphical user interface tools corresponding to the configuration settings of said data-connected physical assets;

on said console display screen, displaying a vector graphic representation of the model-based graphical user interface tools so as to present an interactive control interface including said model-based graphical user interface tools to a user of the console;

using said interactive control interface, accepting a plurality of inputs through said one or more model-based graphical user interface tools, the inputs corresponding to a plurality of draft configuration changes of said data-connected physical assets;

using a console processor to determine whether any of the draft configuration changes violates any logical configuration change rules;

when a first draft configuration change violates a first logical configuration change rule, using the GPU to update the model-based three-dimensional vector graphics representation of said data-connected physical assets to graphically indicate that the first draft configuration change violates the first logical configuration change rule, wherein:
the first draft configuration change is for a target data-connected physical asset, and
the update to the model-based three-dimensional vector graphics representation of said data-connected physical assets graphically indicates a potential logical configuration change violation resulting from the first draft configuration change to the target data-connected physical asset and a potential negative impact of the logical configuration change violation to (a) a second data-connected physical asset that is in network communication with the target data-connected physical asset and/or (b) a network connection that is associated with the target data-connected physical asset; and when none of the draft configuration changes violates any of the logical configuration change rules:
with the console processor, committing each draft configuration change to a corresponding target data-connected physical asset;
storing the draft configuration changes in computer-readable memory that is accessible to the console processor;
after committing each draft configuration change, receiving a rollback request to restore a last configuration state of the data-connected physical assets; and
in response to the rollback request and using the console processor: retrieving the draft configuration changes from the computer-readable memory;
generating draft inverse configuration changes based on the draft configuration changes, the draft inverse configuration changes having a reverse sequence compared to the draft configuration changes; and
in response to determining that any of the draft inverse configuration changes violates any of the logical configuration change rules, graphically indicating that the draft inverse configuration change violates the first logical configuration change rule, and in response to determining that any of the draft inverse configuration changes is not reversible, graphically indicating that the draft inverse configuration change is not reversible.

2. The method of claim 1, further comprising accepting a second input through said one or more model-based graphical user interface tools that modifies at least one of the draft configuration changes, in response to the violation of the first logical configuration change rule, to form a plurality of updated draft configuration changes.

3. The method of claim 2, further comprising:
using the console processor to determine whether any of the updated draft configuration changes violates any of the logical configuration change rules; and
when a first updated draft configuration changes violates at least one logical configuration change rule, using the GPU to update the model-based three-dimensional vector graphics representation of said data-connected physical assets to graphically indicate that the first updated draft configuration change violates the at least one logical configuration change rule.

4. The method of claim 2, further comprising, before accepting the second input, graphically prompting the user, in response to the violation of the first logical configuration change rule, to modify the draft configuration changes.

5. The method of claim 1, further comprising:
using the console processor to determine whether the user is authorized to make each draft configuration change; and
when the user is not authorized to make at least one draft configuration change, using the GPU to update the model-based three-dimensional vector graphics representation of said data-connected physical assets to graphically indicate that the at least one draft configuration change is not authorized.

6. The method of claim 1, wherein the first logical configuration rule is based on a data model of a class of said data-connected physical assets, the data model describing a hardware of the class of said data-connected physical assets, a software of the class of said data-connected physical assets, and modifiable configurations, settings, and/or parameters of the class of said data-connected physical assets.

7. The method of claim 1, further comprising when none of the draft configuration changes violates any of the logical configuration change rules:
with the console processor, translating each draft configuration change to a corresponding target data-connected physical asset format.

8. The method of claim 1, further comprising when a first draft inverse configuration change violates at least one logical configuration change rule, using the GPU to update the model-based three-dimensional vector graphics representation of said data-connected physical assets to graphically indicate that the first draft inverse configuration change violates the at least one logical configuration change rule.

9. The method of claim 8, further comprising when none of the draft inverse configuration changes violates any of the logical configuration change rules:
with the console processor, translating each draft inverse configuration change to the corresponding target data-connected physical asset format; and
with the console processor, committing each draft inverse configuration change to the corresponding target data-connected physical asset.

10. A system for monitoring and controlling networked physical assets, comprising:
a computing console comprising a console processor configured and arranged to execute instructions for monitoring and controlling said physical assets, and to access data encoded into a data store of said console corresponding to a plurality of controllable features of said physical assets; and
a graphics circuit configured and arranged to generate a graphical output onto a display screen coupled to said console, and further configured and arranged to execute machine-readable instructions to generate a plurality of displayable screen views onto said display screen, each of said screen views comprising a transparent background and screen coverage size and area, wherein a plurality of said screen views are simultaneously generated by said graphics circuit and presented in respective positions relative to one another on said display screen and each of said screen views presents respective information relating to one or more of the controllable features of said physical assets, and wherein each of said screen views presents an interactive control interface that includes one or more user interface tools permitting changing of the encoded data in said data store and changing of corresponding controllable features of the physical assets, wherein the console processor is further configured and arranged to execute instructions to:
receive a plurality of draft configuration changes of said physical assets through the one or more user interface tools;
determine whether any of the draft configuration changes violates any logical configuration change rules;
when a first draft configuration change violates a first logical configuration change rule, update at least one of the screen views to graphically indicate that the first draft configuration change violates the first logical configuration change rule,
wherein:
the first draft configuration change is for a target data-connected physical asset, and
the update to the at least one of the screen views to graphically indicate that the first draft configuration change violates the first logical configuration change includes graphically indicating a potential logical configuration change violation resulting from the first draft configuration change to the target data-connected physical asset and a potential negative impact of the logical configuration change violation to (a) a second data-connected physical asset that is in network communication with the target data-connected physical asset and/or (b) a network connection that is associated with the target data-connected physical asset; and when none of the draft configuration changes violates any of the logical configuration change rules:
commit each draft configuration change to a corresponding target data-connected physical asset;
store the draft configuration changes in computer-readable memory that is accessible to the console processor;
after committing each draft configuration change, receive a rollback request to restore a last configuration state of the data-connected physical assets; and
in response to the rollback request:
retrieve the draft configuration changes from the computer-readable memory;
generate draft inverse configuration changes based on the draft configuration changes, the draft inverse configuration changes having a reverse sequence compared to the draft configuration changes; and
in response to determining that any of the draft inverse configuration changes violates any of the logical configuration change rules, update at least one of the screen views to graphically indicate that the draft inverse configuration change violates the first logical configuration change rule, and in response to determining that any of the draft inverse configuration changes is not reversible, update at least one of the screen views to graphically indicate that the draft inverse configuration change is not reversible.

* * * * *